(12) United States Patent
Commisso

(10) Patent No.: US 10,198,408 B1
(45) Date of Patent: Feb. 5, 2019

(54) SYSTEM AND METHOD FOR CONVERTING AND IMPORTING WEB SITE CONTENT

(71) Applicant: Go Daddy Operating Company, LLC, Scottsdale, AZ (US)

(72) Inventor: Stephen Commisso, Aliso Viejo, CA (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 427 days.

(21) Appl. No.: 14/043,656

(22) Filed: Oct. 1, 2013

(51) Int. Cl.
*G06F 17/00* (2006.01)
*G06F 17/22* (2006.01)

(52) U.S. Cl.
CPC .................. *G06F 17/2247* (2013.01)

(58) Field of Classification Search
CPC .................. G06F 17/2247; G06F 17/3089
See application file for complete search history.

(56) References Cited

U.S. PATENT DOCUMENTS

| | | |
|---|---|---|
| 6,263,352 B1 | 7/2001 | Cohen |
| 6,313,835 B1 | 11/2001 | Geyer et al. |
| 7,062,492 B1 | 6/2006 | Graham |
| 7,111,229 B2 | 9/2006 | Nicholas et al. |
| 7,500,182 B2 | 3/2009 | Kelly |
| 7,500,183 B2 | 3/2009 | Kelly |
| 7,680,901 B2 | 3/2010 | Rechterman et al. |
| 8,037,168 B2 | 10/2011 | Schneider |
| 8,356,090 B2 | 1/2013 | Parsons et al. |
| 8,508,532 B1 * | 8/2013 | Logan .................. G06F 17/211 345/440 |
| 2003/0046082 A1 * | 3/2003 | Siegel ............... G06F 17/30017 704/270 |
| 2003/0172145 A1 | 9/2003 | Nguyen |
| 2004/0059793 A1 | 3/2004 | Gruber et al. |
| 2004/0199620 A1 | 10/2004 | Ruiz et al. |
| 2004/0249978 A1 | 12/2004 | Marappan et al. |
| 2005/0028077 A1 * | 2/2005 | Wen ...................... G06F 17/218 715/272 |
| 2005/0216287 A1 | 9/2005 | Crosby et al. |
| 2006/0143562 A1 * | 6/2006 | Seurig ................. G06F 17/2247 715/234 |
| 2006/0174199 A1 | 8/2006 | Soltis et al. |

(Continued)

OTHER PUBLICATIONS

Review of Personalization Technologies: Collaborative Filtering vs. ChoiceStream's Attributized Bayesian Choice Modeling, ChoiceStream, Apr. 2004, http://www.choicestream.com/pdf/ChoiceStream_TechBrief.pdf.

(Continued)

*Primary Examiner* — Scott T Baderman
*Assistant Examiner* — Matthew G McVicker
(74) *Attorney, Agent, or Firm* — Quarles & Brady LLP

(57) ABSTRACT

A system and method for converting and importing web site content are presented. A web page is rendered to create a rendered web page. The web page may be rendered by at least one server communicatively coupled to a network. The rendered web page is inspected to identify a plurality of display elements. Display attributes are captured for each one of the plurality of display elements in the rendered web page, and mark-up code is generated using the display attributes for each one of the plurality of display elements.

15 Claims, 18 Drawing Sheets

(56) References Cited

U.S. PATENT DOCUMENTS

| | | |
|---|---|---|
| 2006/0200751 A1 | 9/2006 | Underwood et al. |
| 2008/0126170 A1 | 5/2008 | Leck et al. |
| 2008/0270486 A1 | 10/2008 | Hind et al. |
| 2009/0094137 A1 | 4/2009 | Toppenberg et al. |
| 2009/0177959 A1* | 7/2009 | Chakrabarti ........ G06F 17/2229 715/234 |
| 2009/0248707 A1* | 10/2009 | Mehta ................... G06F 17/212 |
| 2010/0042914 A1* | 2/2010 | Horiuchi ............... G06F 17/218 715/235 |
| 2010/0080411 A1* | 4/2010 | Deliyannis ........ G06F 17/30864 382/100 |
| 2011/0083185 A1* | 4/2011 | Sheleheda ............. G06F 21/552 726/24 |
| 2012/0110438 A1* | 5/2012 | Peraza .................. G06F 17/214 715/243 |
| 2013/0067319 A1 | 3/2013 | Olszewski |
| 2013/0103803 A1 | 4/2013 | Parsons et al. |
| 2013/0117008 A1* | 5/2013 | Condie ................. G06F 17/289 704/2 |
| 2013/0124953 A1* | 5/2013 | Fan ....................... G06F 17/212 715/202 |
| 2013/0275854 A1* | 10/2013 | Lim .................... G06F 17/2705 715/234 |
| 2013/0283148 A1* | 10/2013 | Lim .................... G06F 17/2247 715/234 |

OTHER PUBLICATIONS

Website Personalization: An Empirical Study of Novice and Expert Users on MyYahoo.com. http://www.doug-info.com/papers/personalization.htm. Fall 2000.

Personalization is Over-Rated. http://www.useit.com/alertbox/981004.html. Oct. 4, 1998.

Novice vs. Expert Users. http://www.useit.com/alertbox/20000206.htm. Feb. 6, 2000.

Intranet Portals: A Tool Metaphor for Corporate Information. http://www.useit.com/alertbox/20030331.html. Mar. 31, 2003.

The personalization story. ITworld.com. http://www.itworld.com/Man/2676/ITW010511rosenberg/pfindex.html. May 11, 2001.

Microsoft Computer Dictionary, 5th Edition, 2002, p. 383.

PR Newswire, WiredAlumni.com Offers Free Online Alumni Communities, Jun. 1, 2000.

* cited by examiner

This is a blue paragraph header with an underlined word.

This is a green paragraph with some bold or *italicized* words that has more words than the header.

FIG. 6A

```
<div>
  <font style="color:blue;font-size:14pt">This is a blue paragraph header with an</font>
  <font style="color:blue;font-size:14pt;text-decoration:underline">underlined</font>
  <font style="color:blue;font-size:14pt"> word.</font>
</div>
<div>
  <font style="color:green;font-size:11pt">This is a green paragraph with some <b>bold</b> or
  <i>italicized</i> words that has more words than the header.</font>
</div>
```

FIG. 6B

```
h1 {
    color: blue;
    font-size: 14pt;
}
p {
    color: green;
    font-size: 11pt
}
.underline {
    text-decoration: underline;
}
.center {
    text-align: center;
}
.right {
    text-align: right;
}
.justify {
    text-align: justify;
}
```

FIG. 7A

```
<h1>This is a blue paragraph header with an <span class="underline">underlined</span> word.</h1>
<p>This is a green paragraph with some <strong>bold</strong> or <em>italicized</em> words that has more words than the header.</p>
```

FIG. 7B

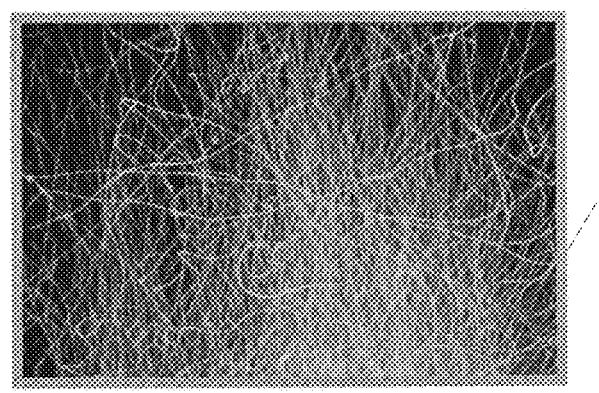
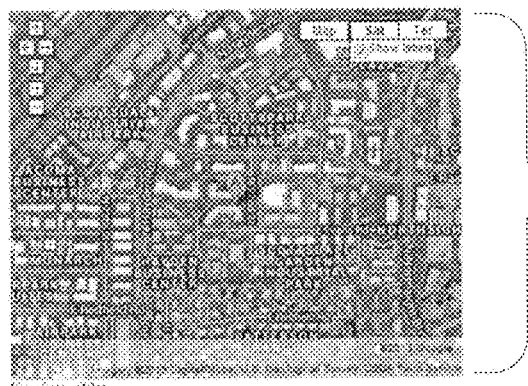
FIG. 9B

FIG. 10

SYSTEM AND METHOD FOR CONVERTING AND IMPORTING WEB SITE CONTENT

FIELD OF THE INVENTION

The present disclosure generally relates to web site content processing, and more specifically, to systems and methods for analyzing and generating a revised version of web site content.

BACKGROUND OF THE INVENTION

The Internet comprises a vast number of computers and computer networks that are interconnected through communication links. The interconnected computers exchange information using various services. In particular, a server computer system, referred to herein as a web server, may connect through the Internet to a remote client computer system, referred to herein as a requesting device. The requesting device may request and receive, from the web server, web sites containing one or more graphical and textual web pages of information. A request is made by visiting the web site's address, known as a Uniform Resource Locator ("URL"). Upon receipt, the requesting device can display the web pages. The request and display of the web site's content are typically conducted using a browser. A browser is a special-purpose application program that effects the requesting of web pages and the displaying of web page content.

The information on web pages is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages may use it to some extent. HTML uses text indicators called tags to provide interpretation instructions to the browser. The tags specify the composition of design elements such as text, images, shapes, hyperlinks to other web pages, programming objects such as JAVA applets, form fields, tables, and other elements. By default, the browser processes HTML instructions in the order they are listed, so that elements appear on the web page according to the HTML processing flow. HTML can be used to establish design element positioning in combination with Cascading Style Sheets ("CSS") or a number of other technologies to ascribe either a relative or an absolute position of the element on the web page, as depicted on the requesting device. Relative positioning of an element retains the element within the HTML processing flow, moving the element a proscribed number of pixels horizontally or vertically away from the place the element otherwise would have appeared. In contrast, absolute positioning places the element a proscribed number of pixels from the top-left (or top-right in countries with right-to-left reading direction) corner of the web page.

When constructing a web site, many users, rather than directly write the code that makes up the web site, use tools that assist in the design and construction of the web site. These tools, sometimes referred to as web site builders, allow for the construction of web sites without manual code editing. The tools usually provide what-you-see-is-what-you-get (WYSIWYG) interfaces enabling the user's to construct web sites by dragging and placing different content, such as text, images, video, and the like, directly onto a webpage. As the user constructs their web site using the web site builder's interfaces, the structure of the web pages being constructed is saved. After the user has finished constructing their web site using the web site builder, the user can save the web site and, in some cases, publish the constructed web site to the Internet. In many cases, web site builders use proprietary code structures to store the content of the constructed web site. It is only when the user elects to publish their web site that the proprietary code is converted into a standard web language (e.g., HTML) that is suitable for publication to a web server.

Although many web site builder applications exist, they generally lack the capability to import existing web site content. As such, if a user wishes to build a web site using a particular web site builder, the user must start from the very beginning by entering all content into the web site builder manually. Although the web site builder may be provide pre-made templates, for example, if the user has an existing web site, the user cannot import that existing web site directly into the web site builder.

BRIEF DESCRIPTION OF THE DRAWINGS

FIG. 6A shows a portion of an example as-rendered web page, the DOM of which may be analyzed to automatically generate a master style sheet in accordance with the method illustrated in FIG. 5.

FIG. 6B illustrates HTML code underlying the rendered text shown in FIG. 6A.

FIG. 7A illustrates an example style sheet that may be created in accordance the method described in the present disclosure.

FIG. 7B illustrates hyper-text markup language (HTML) code that can be generated for the as-rendered web page depicted in FIG. 6A.

FIGS. 9A-9E are a series of screenshots illustrating steps in the website scraping and analysis process described in the present disclosure.

FIG. 10 illustrates example HTML code that may be generated using the as-rendered web page depicted in FIG. 9.

DETAILED DESCRIPTION OF THE PREFERRED EMBODIMENT

The present disclosure provides a system and method by which existing web site content may be analyzed and imported into an application, such as a web site builder, or other storage target. The system and method may be performed by a computer system, such as a hosting web server, computer server, personal computing device, mobile device, or any other computing system, configured to retrieve and analyze web site content.

In many situations, the code underlying a particular web site is complicated and convoluted. This can result from the involvement of many different people, each having different styles and approaches, in the creation of the web site. Different portions of the web site may have been coded and prepared by different people at different times, sometimes with no communication between the coders and designers. Sometimes web sites include code that has been incorporated from different publishers or other entities distributing their own web site code. In other circumstances, a web site (or portions thereof) may have been constructed using a web site builder that itself outputs convoluted code. As a consequence, although a particular web site may render as desired within a particular web browser, it is quite difficult to directly inspect and modifying the underlying code of the web site without breaking or disrupting other portions of the web site due to the code's complexity. This can make it difficult, for example, to import an existing web site directly into an application, such as a web site builder or editor. Additionally, because the underlying code is complicated and convoluted, it can be difficult for search engines to inspect such a web site and identify context for the web site's content (e.g., by identifying useful or important content of the web site). This can detrimentally affect the web site's search engine optimization and, as a result, the web site's search engine rankings.

Figure 1:
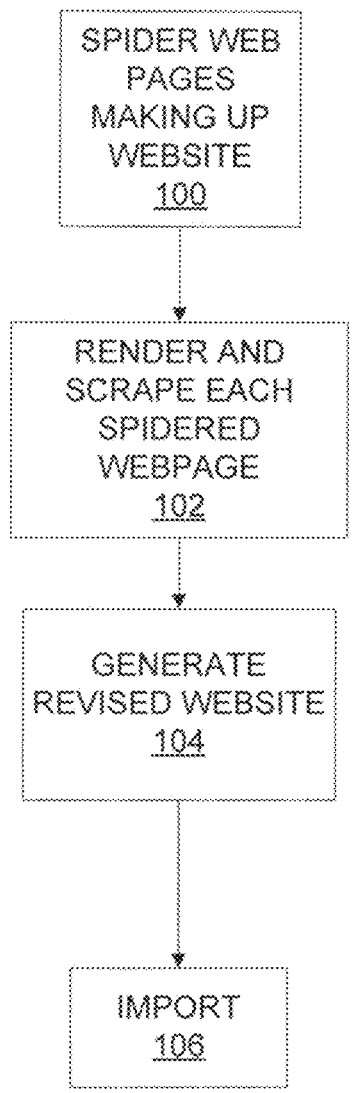
FIG. 1 is a flowchart illustrating a method for importing and converting web site content in accordance with the present disclosure.

The present system and method overcomes these drawbacks by allowing for the conversion of existing web site content into a simplified or refined form thereby facilitating the importation of the revised web site into other applications. To illustrate, FIG. 1 is a flowchart illustrating a method for analyzing and converting web site content in accordance with this disclosure.

In step 100, a target web site is identified and spidered. The spidering of a web site involves analyzing the web site to identify each one of the web pages that make up the web site. This may be done by recursively crawling through each web page on the web site—for example, by following each link on a main web page of the web site to a number of additional web pages and then following each link on each of those additional web pages, and so on. To detect "orphaned" pages, or pages not accessible by following a path from the homepage, the spider may additionally attempt to locate a sitemap file and use that to find any additional pages. Alternatively, if the spider has direct access to the hosting environment, the file system of the server hosting the web site may be directly inspected to identify each web page making up the web site.

After the web site has been spidered, in step 102 the content of each web page identified by the spider is retrieved and rendered. This may be performed, for example, by downloading the content of each web page and rendering the content using a suitable rendering engine, such as PhantomJS, HtmlUnit, or another headless browser or rendering engine.

After the web page content is retrieved and rendered, the content of each web page, as rendered, is directly inspected using the rendering engine and scraped to identify the various display elements (e.g., text, images, shapes, etc.) that appear on the as-rendered web page. At that time, various attributes of each of the identified display elements can be captured from the as-rendered version of the web page. This may involve, for example, noting the position of each element that is displayed within the rendered web page, as well as the element's geometry. In the case of text display elements, the font, font size, color, etc. of each text display element may also be recorded. In the case of images, the position, size, and background color, for example, of each image display element may also be recorded.

The output of scraping process 102 is a comprehensive listing of each display element (e.g., text, image, video, widget, etc.) in each web page of the web site as well as the display properties (e.g., font, font size, size, positioning, background color, etc.) of each of those display elements in the as-rendered website. The creation of this listing, therefore, does not inspect, analyze, or otherwise rely on the source code for the web pages making up the web site. In essence, the source code of the web site, which can complex and convoluted, is ignored and instead the web site is rendered and it is the as-rendered version of the web site that is analyzed.

In step 104, the listing of display elements gathered in step 102 is analyzed and a revised version of the web site is generated or rendered. During this process, for example, a set of style sheets may be generated or rendered for the web site as well as revised HTML code. The new HTML, rendered in combination with the new style sheet or sheets, results in the same visual layout of display elements as was present in the original web site. The code generated in this step, however, can be in a refined structure as compared to the original source code. The structure reduces the display elements of the original web site to their basic form, minimizing duplication and improving the overall structure of the web site's underlying code.

This version of the web site, with consistent and up-to-date uses of HTML and style sheets, may then be imported into a target application in step 106 or, alternatively, may replace the original web site. Because the new version of the web site uses improved underlying code, that version of the web site is easier to import into an application, such as a web site builder, and then modify using such an application. Additionally, by creating the web site using up-to-date coding practices, the search engine optimization for the web site can be improved.

Accordingly, this process, rather than attempting to analyze the original code underlying a particular web site in order to import that code, instead analyzes the web site's content, potentially including each of the web pages making up the web site, after that content has been rendered by a suitable rendering engine. This allows the present system and method to recreate the original web site using a refined code structure based upon the as-rendered web site, as will described in detail below.

Figure 2:
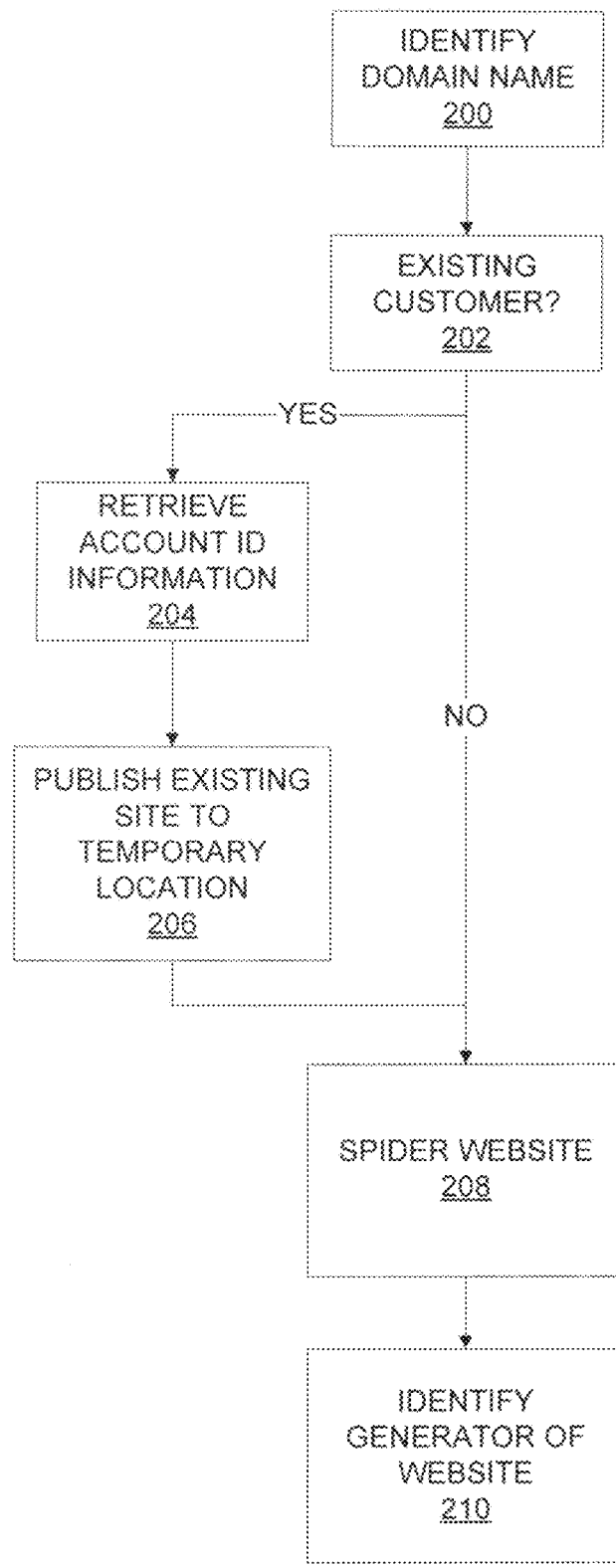
FIG. 2 is a flow chart illustrating a method for spidering a target web site to identify a number of web pages making up the target web site.

FIG. 2 is a flow chart illustrating a method for spidering a target web site to identify a number of web pages making up the target web site. In step 200, a domain name for the target web site is identified. The domain name identified in step 200 may generally include any uniform-resource locator (URL) identifying a main web page of a web site or collection of web pages.

The domain name may be provided by a user submitting the domain name to a tool, such as a web site builder, via a suitable user interface, such as a web page. Alternatively, the target domain name may be identified automatically, for example, by software running on a computer server or other computing device.

In some cases, the method illustrated in FIG. 2 is performed by a server under the control of a web hosting provider. Accordingly, after the target domain name is identified, in step 202 the server may determine whether the target domain name belongs to an existing customer of the web hosting provider. If so, in step 204 customer records associated with the customer can be accessed to determine the customer's account identifier (and any other pieces of customer-identifying information, such as a shopper ID or private label ID). This identifier or identifiers can then be recorded for later use and analysis. For example, if an existing customer is identified (and the relevant IDs for that customer are identified), it may be possible to automatically upgrade the customer's website to a new version using the importing methods described herein.

Additionally, if the domain name is associated with an existing customer of the web hosting provider, in step 206 the customer's existing web site that is associated with the target domain name can be published to a temporary location. This temporary copy of the web site can then be utilized for the processing described below. By publishing the web site to a temporary location, performance of the spider (as well as other processing) may be increased, while minimizing the performance impact on the customer's live web site as well as the potential for data losses.

In step 208, the web site associated with the target domain name is spidered. Spidering involves the systematic crawling and, thereby, identification of every web page within the target web site. To begin, the spider accesses the main web page associated with the domain name of the web site being spidered. That web page is then analyzed to identify all links present on the main page. The spider then follows each of the links that points to another web page falling under the target domain name. For each of those linked-to web pages, the spider retrieves the links contained on those web pages and then identifies which of those links point to additional web pages that fall within the target domain name. The spider continues recursing through the web site's links in this manner until all web pages belonging to the web site have been identified. As such, the spider recursively crawls through each web page in the web site in order to identify each web page making up the web site.

Depending upon the system implementation, the spider can be configured to provide different types of behaviors. To improve performance, multiple spiders may be run in parallel against the target domain name. Similarly, the spider may be configured to be "polite" by operating in a mode that is throttled, or to respect crawler directives like those contained within a robots.txt file, as needed. As such, the spider can be executed in a number of different modes. Site identification mode may cause the spider to process the site, but the system will not go any further in the import process (no scraping, analysis, or import). If running the spider in identification mode, the politeness configuration can be set to respect robots.txt. However, when the spidering process is implemented for the purpose of importing the site in accordance with the present disclosure, the politeness configuration of the spider can be set to ignore robots.txt so that all pages belonging to the site can be run through the import process.

In addition, when running the spider in import mode, an additional HTTP request to try to find a sitemap file that may be referred to by the web site's robots.txt file (e.g., sitemap.xml) can be made. The sitemap file may contain links to each web page making up a particular web site.

If found, the sitemap.xml file can be parsed to identify all web pages listed therein and the results compared against the result of the spidering process to find any orphaned web pages that, although belonging to the web site, are not linked to by other web pages of the web site (i.e., web pages that are not accessible in the navigation hierarchy starting with the domain name's main page). If such orphaned web pages are identified, follow-up HTTP requests can be made by the spider to parse those web pages to ensure that the web pages actually exist before adding them to the result of the spidering process.

The output generated by the spidering process, therefore, includes a list of URLs for each web page in the web site under the target domain name. In some implementations, the spider will also attempt to identify a web site builder that was utilized to construct the web site in step 210. If the spider was able to identify the web site builder responsible for the web site (e.g., because the web site builder identified itself in the source code of the web site), the detected web site builder information may also be included in the output of the spidering process.

Once the target web site has been spidered, thereby generating a list including each web page making up the web site, each web page is scraped. Scraping involves the rendering of a web page. The contents of the rendered web page are then analyzed to identify one or more display elements present on the web page as well as various attributes of those display elements.

Figure 3:
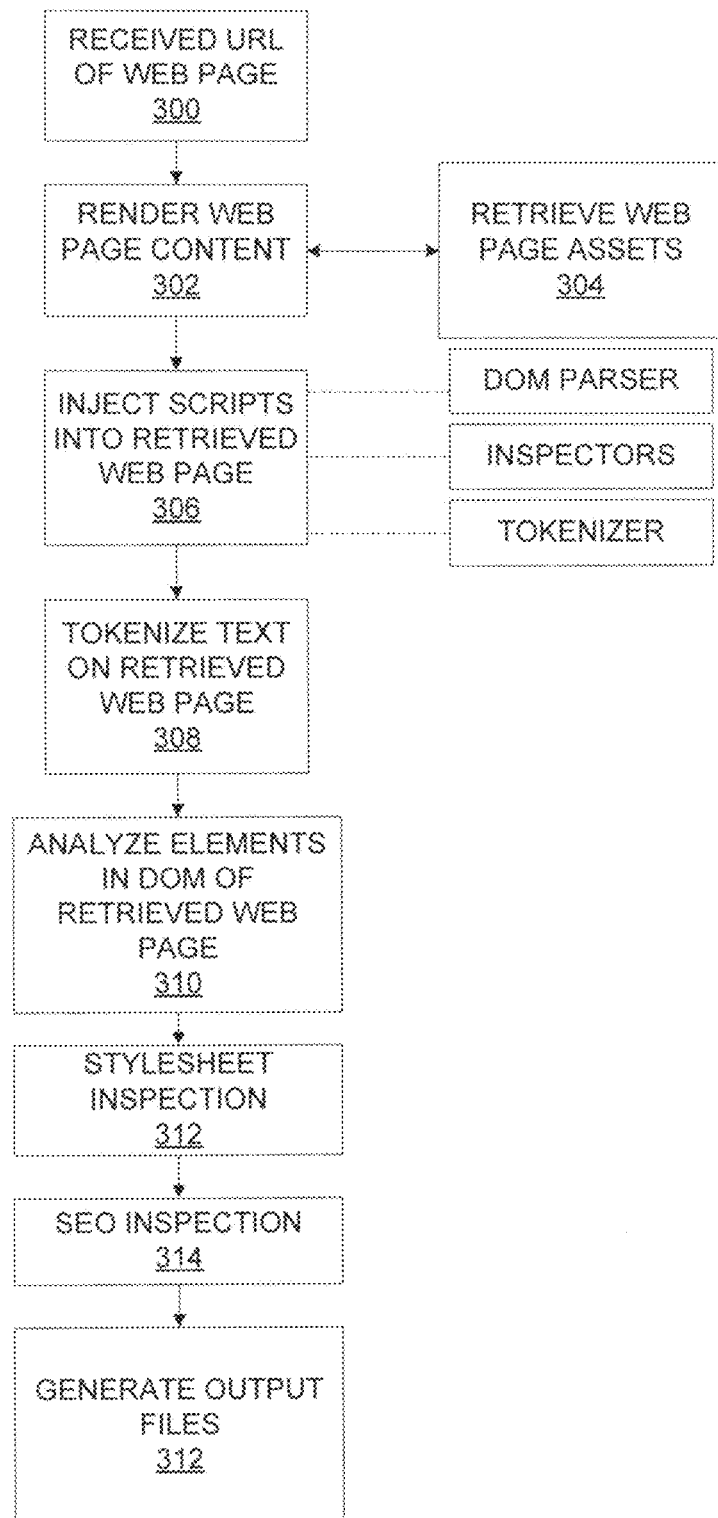
FIG. 3 is a flowchart illustrating a method for scraping a web page in accordance with the present disclosure.

FIG. 3 is a flowchart illustrating a method for scraping a web page in accordance with the present disclosure. In step 300, the URL of the webpage to be scraped is received or otherwise identified. The URL may be retrieved, for example, from the list of web page URLs generated by the spidering process, illustrated in FIG. 2. Accordingly, the scraping process depicted in FIG. 3 may be executed against each web page identified in the spidering process depicted in FIG. 2.

After the URL for the web page is identified, in step 302 the web page is rendered. In one implementation, a windowless rendering engine, such as phantomjs (a windowless WebKit browser) is used to render the web page on a suitably configured computing system. This may involve downloading the source code (e.g., HTML and javascript) for the web page, as well as additional web page assets, such as images, videos, program code, scripts, and the like that make up the content of the web page (step 304).

Once all of the assets for the web page have been downloaded, the web page can be correctly rendered by the renderer as the web page would display in a user's browser window. This rendering step ensures that all of the display elements in the web page are correctly displayed and positioned with respect to one another. This information is not available by inspecting the web page's source code (e.g., HTML code) because the actual rendering and depiction of a web site often depends upon the arrangement and layout of all of the assets incorporated by the web site. Some of these assets can take time to load and it is not until all assets have been finally loaded and displayed and the web page fully rendered that the actual layout and design of the web page can be determined.

As such, step 302 does not complete until all assets associated with the web page have been downloaded and rendered. In web pages that are configured to load content asynchronously (e.g., in a single-page application), the rendering engine will also wait for the asynchronous content to load. In some implementations, where it is known that the web page makes a particular function call or calls upon loading (e.g., requiring javascript or requiring jquery), upon detecting those function calls it can be determined that the web page has loaded. In order to identify those function calls, it may be necessary to analyze the web page, or a framework upon which the web page is constructed, to identify which function calls would indicate that the web page has finished loading. If the web page does not make any such function calls, then it may only be necessary to wait for the web page's content to be downloaded and rendered. In some cases, after all content has been downloaded and rendered a temporal delay (e.g., 10 seconds) is implemented to provide that any active content on the web page has completed rendering.

Once the web page has been rendered (step 302), a number of scripts can be injected into the rendered web page in step 306. The injected scripts include a tokenizer script, a DOM parser and a number of inspectors.

The tokenizer script is configured to, after all content for the web page has been retrieved and rendered, tokenize the text in the rendered web page. This involves converting each word in the rendered web page into its own display element. In one implementation, this involves modifying the as-rendered web page to wrap every individual word that is displayed in the web page in its own HTML tag pair, such as the "<span>" tag. This involves looking for words that are not surrounded by angle brackets, such as a '<' symbol or '>' symbol, as those words form part of an HTML tag and will not be displayed on the web page. For example, the word "face" in the tag "<font face="times, serif">" will not be displayed on the web page and should not be recognized in this step.

Each identified word is then wrapped by a suitable HTML tag pair (e.g., <span> and </span>). When the displayed words fall within an <a> tag pair and, therefore, form part of a hyperlink, the HREF associated with the <a> tag will become associated each word in the hyperlink.

Other HTML tag pairs may be used, but care should be taken to only tokenize each word by wrapping each word in an HTML tag that will not affect the visual depiction of the web page. Depending upon the implementation, this tokenization process can be configured to break the web page's text wherever whitespace occurs, but not including HTML literals like non-breaking spaces.

By modifying the as-rendered web page to place each displayed word in the web page into its own HTML tag, the tags surrounding each tokenized word can be inspected to gather information about each separate word. Specifically, by analyzing the document object model (DOM) for the rendered web page after the text therein has been tokenized, it is possible to determine the exact location and geometry (i.e., width and height) of the bounding box of each word on the web page, as well as each word's font, font size, color, background color, etc.

The DOM parser script is configured to recursively transition through elements belonging to the web page's DOM. Once an element is identified, the DOM parser executes the inspector scripts against the identified element. Depending upon the system implementation, any number of inspector scripts may be utilized. One inspector script may be used, for example, to determine that a particular DOM element includes text-based displayed content and to gather information about that text-based content. Other inspectors may be created for image content, shapes (e.g., a <div> tag with a background-color or background-image style applied), "widgets", <body> content, audio content, and the like. The inspectors can then be executed against each element in the DOM. In the event that a particular DOM element does not include displayed content, but includes descendants, those descendant elements can be inspected for potential displayed content. In some cases, elements within the DOM may be excluded from processing if the element matches a predetermined pattern. In some implementations, certain tags, such as <embed>, <iframe>, or <object>, as well as their descendants, may be determined to always include specialized code that may not be imported, referred to herein as widgets and described in more detail below, and, in some cases, may always be ignored or otherwise excluded from processing.

Accordingly, in step 308, the tokenizer script is executed to tokenize the text on the rendered web page and in step 310 the elements of the DOM of the rendered web page are identified by the DOM parser script and analyzed by the injected inspectors. The inspector scripts can inspect each DOM element identified by the DOM parser to determine whether the element includes text, images, backgrounds, or widgets, for example.

Figure 4:
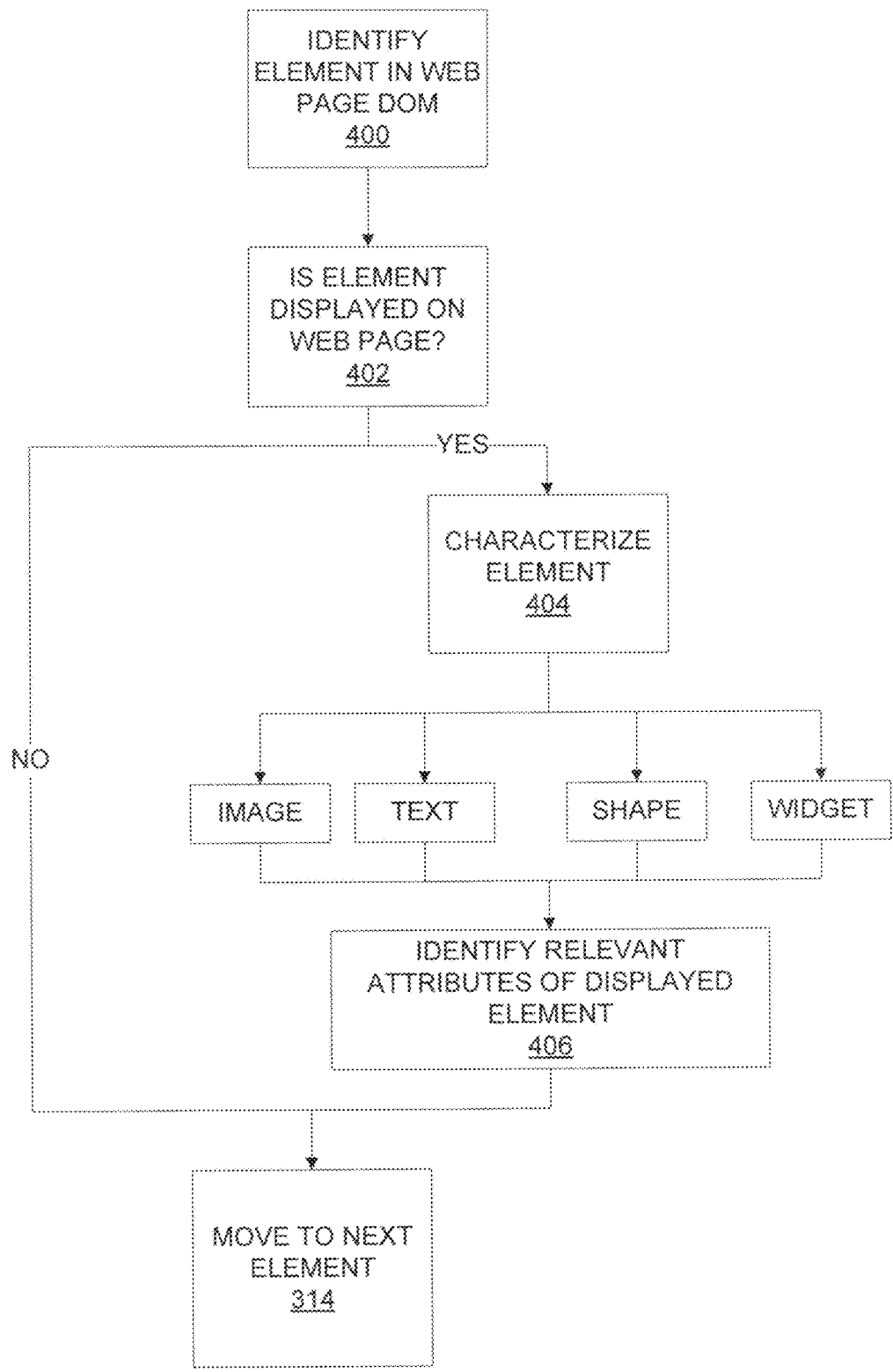
FIG. 4 is a flowchart showing an example method by which an element within a document object model (DOM) of a rendered web page can be inspected and parsed.

FIG. 4 is a flowchart showing one example method by which an element within a DOM of a rendered web page can be inspected and parsed. In step 400, the current element being inspected is identified within the DOM of the rendered web page. This step may be performed, for example, by the DOM parser described above. With the element identified, in step 402, the element is analyzed to determine whether the element is displayed on the web page. The determination of whether a particular element is displayed on the rendered web page may be made, for example, using jquery. Alternatively, the z-index position of the element, as well as the element's bounding boxes in comparison to the bounding boxes of nearby elements can be utilized to determine whether a particular element (or portion of an element) is displayed in the rendered web page or whether it is hidden. If the element is not displayed on the web page (and therefore does not affect the appearance of the web page) the parsing process will move on to the next element in the DOM in step 314. In the event that the element being inspected has descendant nodes within the DOM, step 314 may involve transitioning to one of those descendant nodes and again performing the parsing/inspection process.

If, however, in step 402 it is determined that the element is displayed on the rendered web page, in step 404 the element is characterized. The characterization of the element involves making a determination of a type of the element. The potential element types may include, for example, an image, text, or shape. The type of element may be determined by analyzing the HTML tag associated with the element.

Once the element is characterized in step 404, depending upon the type of element, relevant attributes associated with the element are captured in step 406. If the element is an image, the relevant attributes may include the element's position, size, and background color. If the element is text, the relevant attributes may include the element's position, font styling (e.g., font, color, bold, and italics), font size, and background color. If the element is a shape, the relevant attributes may include the element's position, size, dimensions, borders, background images, and radii.

In some cases, web pages include widgets that, although they display content, are made up of proprietary code. If the element, once characterized, is determined to be a widget (e.g., by detecting the presence of an <object> tag with the element or other code matching a particular signature), even if the widget outputs content to the web page, the DOM element containing the widget may be ignored. No attributes may be collected for widgets. As such, once the web site has been imported, widgets will not appear in the imported web site.

Once the relevant attributes have been identified for the element, the method moves on to the next element in the rendered web page's DOM in step 314 and the method may be repeated on that element. The method depicted in FIG. 4 may be executed against all elements within the rendered web page's DOM.

In one system implementation, the method depicted in FIG. 4 may be performed by a number of different inspector scripts that can be injected into the rendered web page. Different inspector scripts may be configured for each potential type of displayable element on the web page.

Generally, an inspector script will be configured to be executed against elements within a web page's DOM. The inspector script will be configured to detect a specific type of displayable content (e.g., text, images, etc.) by comparing that content against a signature. If that particular type of content is detected within the element being inspected (i.e., the content matches the signature), the inspector script is configured to gather information describing the content and how the content is displayed in the web page. If the content type does not match the signature of the inspector script, the inspector script may be configured to ignore the element. When using inspector scripts, therefore, each available inspector script may be executed against each element in the DOM.

Accordingly, depending upon what types of content are to be imported from the existing web site, a different number of inspector scripts, where each inspector script is configured to detect and inspect or scrape a different type of content, may be utilized. For example, inspector scripts may only be used to detect text, image, and shape content in a rendered web page. Additional inspector scripts for other types of content, though, such as widgets, audio, and video can be prepared and utilized. Inspector scripts can also be prepared to detect and scrape specific types of content, such as YOU TUBE video links, PAYPAL links, etc.

When multiple inspector scripts are used to inspect the web page content, the most specific inspector scripts can be executed first (e.g., inspector scripts looking for YOU TUBE or PAYPAL links), and more general inspector scripts are executed later (e.g., inspector scripts that look for basic text or image content). Once an inspector script detects recognized content, in one implementation no more inspector scripts may be executed against the current element and the DOM parser moves on to the next element.

A text inspector script, for example, may inspect a particular DOM element looking for text content matching a particular signature. If the text inspector determines that the element includes literal content (i.e., text not within tags), the text inspector identifies the element as displayed text content. In one implementation, the text inspector looks for any text (including <br/> tags) contained within the tag pairs: <p>, <h1>-<h6>, <font>, <span>, <div>, <ul>, <li>, <strong>, <em>, <u>, <i>, <b> that is not contained within other tags identified as belonging to a widget. When displayed text is identified, the text inspector retrieves various attributes of that element that would be required to recreate the element inside a new web page. These attributes include, but are not limited to: the text content itself, position (top/left), size (width/height), font styling (face/size/color/bold/italic), and embellishments (background color/borders/radii). In some implementations, the text inspector would also determine whether the displayed text has an ancestor tag that includes an <a> tag with an href (meaning that the displayed text is displayed on the web page as part of a hyperlink). In that case, the text inspector would capture the href target for the parent <a> tag, as well as display attributes of the <a> tag (e.g., styles associated with the active, hover, never visited, and visited states of the <a> tag). The href and the style attributes would then be associated with the displayed text.

Similarly, an image inspector script, for example, may inspect a particular DOM element. If the image inspector determines that the element includes literal image content matching a particular signature (i.e., a link to an image or <img> tag that is not contained within a widget), the image inspector identifies the element as displayed image content. When displayed image content is identified, the image inspector retrieves any attributes of that element that would be required to recreate the element inside of a new web page. These attributes include, but are not limited to: image link, position (top/left), shadow, padding, size (width/height), and embellishments (background color/border styles/radii).

A widget inspector may inspect a particular DOM element to determine whether the element is a widget. A widget can be a unique or specialized piece of code that may be incorporated into a web page. Widgets may be used, for example, to display specialized menu systems, or other content that is significantly more complicated that static web page content. Because widgets require specialized code to operate, it can be difficult to import widget-based content, without also requiring that the significant amount of additional code utilized by the widget also be incorporated. As such, if the widget detector determines that the element is a widget, that is, if the element includes code that matches a pre-determined pattern (e.g., code, instructions, or other content), the element may be excluded from further processing. If a widget inspector is utilized, the widget inspector may be executed before all other inspector scripts to ensure that widget content is not imported. In some cases, though, the widget inspector may be configured to incorporate only the static content that forms part of a widget.

In some cases, the signature utilized by the widget inspector to detect widgets may be a form tag having a specific action attribute that contains a predetermined text string (e.g., "paypal"). In some cases, a widget may include a map application that can be identified by detecting content matching the signature of a <div> tag containing a specific attribute. A photo album widget may be similarly detected—by detecting content matching a signature of a <div> tag containing a specific attribute or class. If a photo album is detected on the web page, it may be possible to analyze the javascript contained within the web page to identify a listing of photographs that are contained within the photo album. That listing can then be used to re-create a photo album within the imported web page. In some implementations, the signature for a widget may be no more than an <object>, <embed>, or <iframe> tag.

An audio content inspector may inspect a particular DOM element to determine whether the element contains a reference to audio content (e.g., the element includes an <audio> tag). If so, the inspector retrieves any attributes of that element that would be required to recreate the audio content in a new web page. In the case of an <audio> tag, these attributes include, but are not limited to, URL, a playlist, a source file name, repeat, autoplay, volume, initial seek time, etc.

A YOU TUBE inspector may inspect a particular DOM element to determine whether the element contains a reference to a video hosted on the video sharing web site http://www.youtube.com. If so, the inspector retrieves any attributes of that element that would be required to recreate the video inside of a new web page. These attributes include, but are not limited to a link to the video, a YOUTUBE Video ID, an indication of whether the video automatically starts, an indication of whether the video repeats playback upon completion, video meta data (e.g., title, description, etc), and any available video playlist information.

Additional inspectors may be created to identify web page content that is retrieved from a third party, such as TWITTER, FACEBOOK, and the like. Inspectors may also inspect the rendered web page for forms, or slide shows. For example, to identify a slide show, an inspector may inspect the rendered web page to identify a number of images arranged to look like a gallery (e.g., in a table or grid pattern), or an image with left and right buttons, or a URL like "gallery.html?page=1." Inspectors can be created for web site metadata such as SEO information (e.g., <title> and <description> tags within a web page's<head>), or Open Graph content (e.g., by identifying FACEBOOK metatags (e.g., "og:title", "og:type") in the <head> tag of a web page. An inspector may be created for the body of a web page, in which case the signature is the <body> tag. Once identified, attributes of the body content, such as background styles, can be captured. An inspector may be created for linked documents. In that case, the signature may be <a> tags that link to non-html files within the same website.

In general, inspectors can be created for any content that is displayed or is interactive on a web page. For a particular inspector, a signature must first be created for the desired content. The signature may be a particular HTML tag or as complicated as identifying a parent tag having a specific set of ancestor tags and including a particular combination of element attributes. Signatures may require the scanning of script files or CSS files that may be associated with the web page or web site. In some cases, the signature files include regular expressions configured to match particular snippets of code that may appear, for example, within a particular widget. Once content matching the inspector's signature is identified, all relevant information necessary to recreate that element within a web page is captured.

Figure 5:
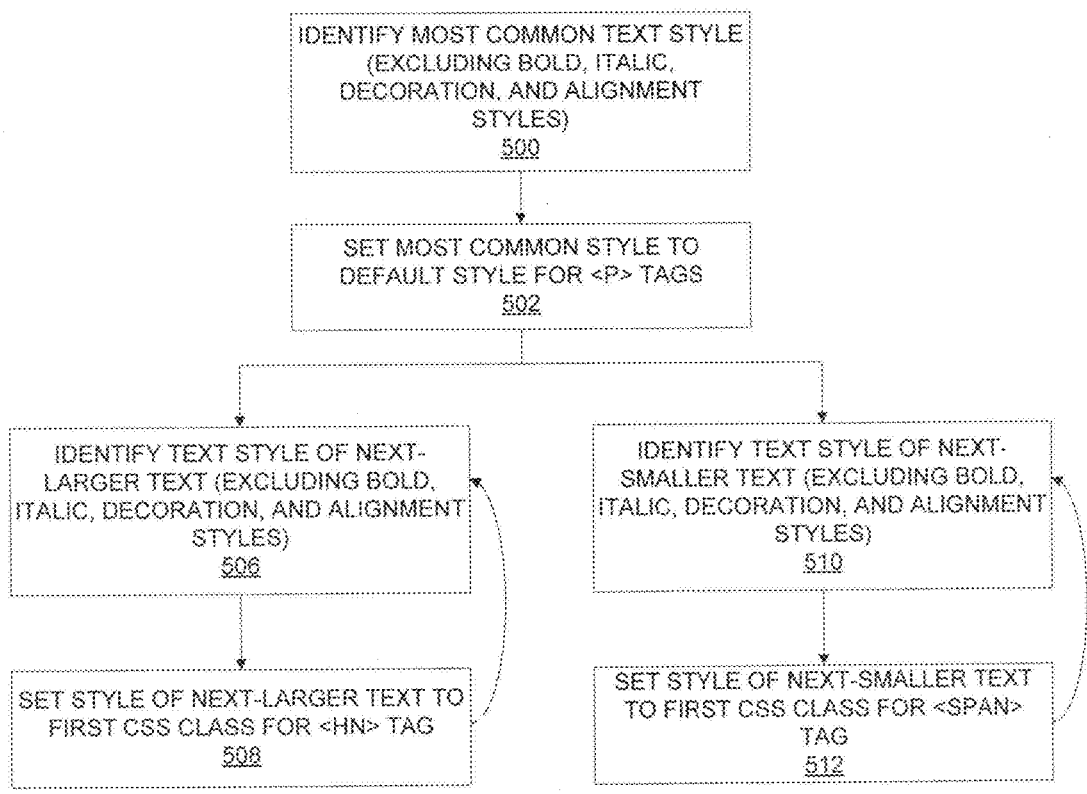
FIG. 5 is a flowchart showing an example method for analyzing the scraped content of a web site to create a style sheet for the web site.

Returning to FIG. 3, after all elements in the web page DOM have been inspected, in step 312 the web page's style sheets are analyzed, if present. This analysis involves analyzing the web page's style sheets for custom fonts or font directives or pseudo-styles (like ":hover" ":active"), which runtime style detection cannot easily observe. Additionally, the style sheet may be inspected for embedded content, such as fonts, images, or other resources. FIG. 5, described below, provides further illustration of how the web page's style sheets may be processed.

After performing the style sheet inspection, in step 314 a search engine optimization (SEO) inspection takes place. The SEO inspection involves analyzing the web page's contents to identify the contents of SEO-related meta-tags in the source code of the web page. Example SEO-related meta-tags include "<title>", "<description>", and "<keywords>". These SEO-related meta-tags can then be recreated within the imported web site.

After steps 310, 312, and 314 have completed (they may be executed serially or, in some implementations, in parallel), in step 312 the scraper generates a number of output files. One output file includes a listing and description of each instance of displayable content identified in the web page by the inspectors. In one implementation, this information may be encoded as a Javascript Object Notation (JSON) file that contains information describing each of the displayable elements identified by the inspectors. For example, for all of the text displayable content identified by the text inspector, the output file may include the text content's content, position, size, font, embellishments, etc. Similarly, for each image displayable content identified by the image inspector, the JSON file may include a reference to the image as well as the image's position, size, etc.

Additionally, the output files may include a snapshot or screenshots of the web page being processed, which can be used for quality assurance purposes (e.g., by comparing the original web page to the imported web page).

After all of the web pages in the web site have been scraped, and the listing and description of each instance of displayable content identified in the web page by the inspectors have been generated for each web page in the web site, the data outputted by the scraping process can be analyzed to generate the new web site code.

A first part of the analysis involves the creation of a new master style sheet for the entire web site. An example method for the creation of such a master style sheet is shown in FIG. 5. In a first step 500, each individual word in the output generated by the scraping process across every web page in the web site is analyzed to determine the most common text style, excluding embellishments such as bold, italic, decoration, and alignment. As such, the most common text style (i.e., the combination of font face, font size, and font color) are identified. In step 502, a style sheet is created, wherein the most common text style identified in step 500 is associated with paragraph ("<p>") tags.

After determining the most common text style (and associating that style with the paragraph tag in the new style sheet), the method moves to step 506 in which each word in the output generated by the scraping process is analyzed to determine the style of text that is the next size larger than the size of the most common text style. That style is then entered into the master style sheet and associated with the first header tag ("<h1>") in step 508. This process continues, continuously searching for incrementally larger text. As larger text is identified, that style will become associated with the <h1> tag and the style previously associated with the <h1> tag will be moved to the <h2> tag. A style previously associated with the <h2> tag would then become associated with the <h3> tag, and so on. This continues until no larger text on the web site is identified. In some cases a web page may include a sufficient variety of larger text styles that the number of styles will exceed the number of available <h> tags—the number of <h> tags may be limited to 6. In that case, in addition to the available <h> tags, <span> tags that are each associated with unique classes can be associated with the larger text styles.

A similar process is used to construct portions of the style sheet for smaller text styles. Accordingly, after determining the most common text style, the method moves to step 510 in which each word in the output generated by the scraping process is analyzed to determine the text style of text that is the next size smaller than the size of the most common text style. That style is then entered into the master style sheet and associated with a <span> tag in step 512. Each <span> tag has a unique name or class enabling the different style to be utilized. This process continues, continuously searching for incrementally smaller text.

In some implementations, when generating a master style sheet for a web site, certain entries will always be added to the style sheet. For example, the generated style sheet may always include generic styles for "underline" decoration, and "center", "right", and "justify" text alignments. "<strong>" and "<em>" tags can be used for bold and italic styled text.

To illustrate an example of style sheet creation, FIG. 6A shows a portion of an example as-rendered web page, the DOM of which may be analyzed to automatically generate a master style sheet in accordance with the method illustrated in FIG. 5. FIG. 6B shows the HTML code underlying the rendered text shown in FIG. 6A. As shown in FIGS. 6A and 6B, the web page includes two different sentences. The sentences are different sizes and the top sentence includes blue text, while the bottom sentence includes green text (see the color setting in the <font> tags in FIG. 6B).

In this example the original HTML (FIG. 6A) is not SEO-optimized. The HTML does not contain any semantic hints to a search engine as to which of the two depicted sentence is more important because the HTML only includes <font> tags to specify the size and color of each sentence. Additionally, the HTML code relies heavily on the <font> tag to set the layout and appearance of the two sentences and does not make use of style sheets.

When analyzed in accordance with the method depicted in FIG. 5, the analysis process would count the words in the rendered web page of FIG. 6A that have distinct styles (considering only font, size, and color and excluding bold, italic, or other font decorations), regardless of the original HTML. This may be referred to as the "style density" of a particular text style within the web site. In this example, the analysis process would count 18 words with a color of "green" and a font size of "11 pt". It would also count 10 words with a color of "blue" and a font size of "14 pt". Due to the style density, the algorithm would select the green text as the default text style and assign that style to the paragraph tag ("<p>") in the new style sheet.

Because the blue text (i.e., the top sentence in FIG. 6A) is larger, the style of the top sentence would become the default text style for the "h1" tag in the new style sheet. The style sheet generator algorithm can be configured to always include generic styles for "underline" decoration, and "center", "right", and "justify" alignments. "<strong>" and "<em>" tags can be used for bold and italic styled text.

Accordingly, after implementing the method of FIG. 5, the style sheet depicted in FIG. 7A is created for the web page of FIG. 6A.

Utilizing the new style sheet, SEO-friendly HTML (depicted in FIG. 7B) can be generated to recreate the web page content that is depicted in FIG. 6A. Within the new HTML (FIG. 7B), header tags (i.e., the <h1> tags) inform a search engine that the contained text is important, and a paragraph tag implies that the contained text is less important. Accordingly, the new HTML, which uses the generated style sheet to determine the font styles of the displayed text provides semantic hints that may be utilized by a search engine to more accurately categorize the content of the web page.

In addition to creating a style sheet for the web site, the analysis process re-groups the tokenized text that was generated by the scraper to form larger groupings of related words. The can be useful to facilitate the user's later editing of the web site and, optionally, the process for importing the new web site into an application, such as a web site builder.

Figure 8:
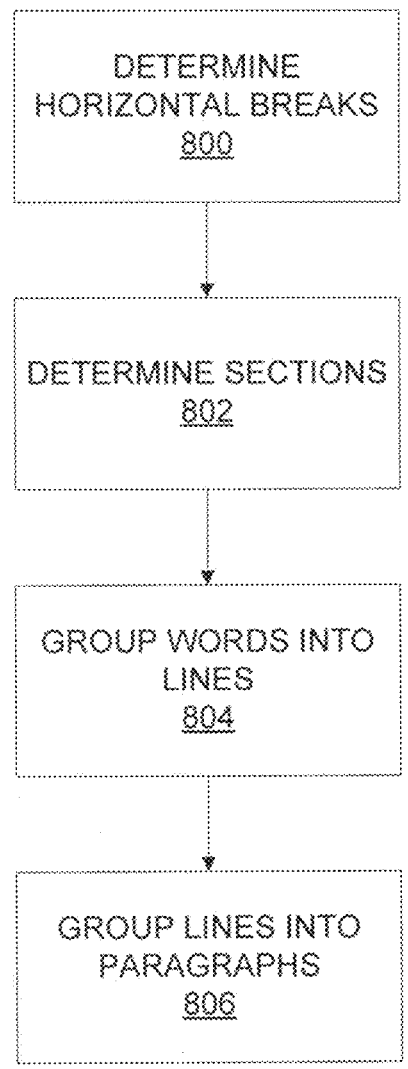
FIG. 8 is a flowchart illustrating a method for inspecting the tokenized words in an output generated by a scraping process to generate larger groupings of related words that can then be used to generate output HTML for an imported web site.

FIG. 8 is a flowchart illustrating a method for inspecting the tokenized words in the output generated by the scraping process to generate larger groupings of related words that can then be used to generate output HTML for the imported web site. Each grouping of words will generally contain words that are in proximity to one another and are likely to belong to the same paragraph, bullet point, or other logical groupings of words. The method is executed against each the scraped content of each web page in the web site and analyzes the output of the scraper process (see FIG. 4) that generates an output describing the location of each of the tokenized words on the as-rendered web page. FIGS. 9A-9E are screenshots depicting the steps of FIG. 8. Although the method of FIG. 8 is, in fact, executed against the output of the scraper process (e.g., a JSON file), FIGS. 9A-9E are provided to depict the steps of FIG. 8 visually.

Figure 9A:
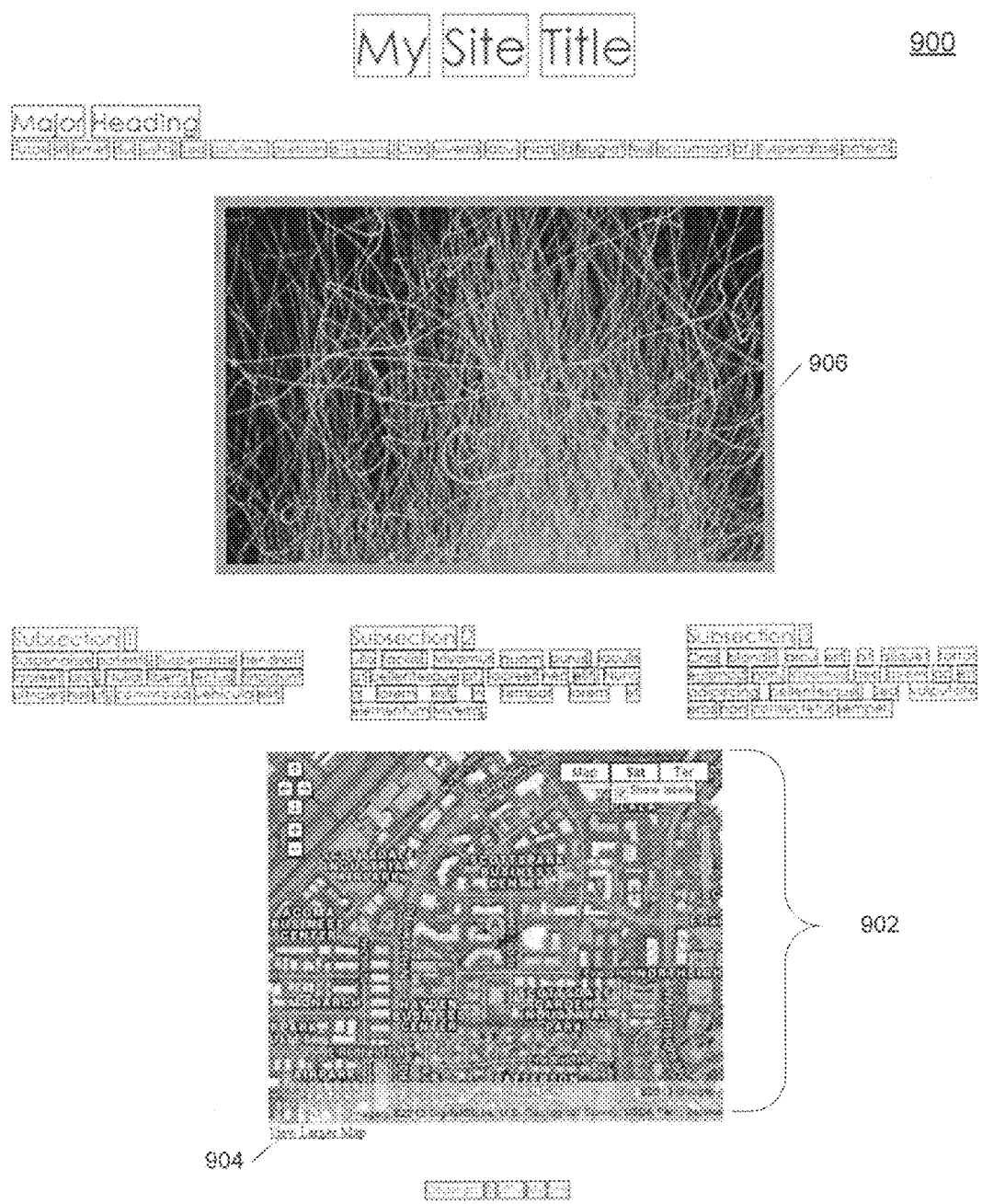

At the time the method of FIG. 8 is executed, each word in the word content of the web page has been tokenized. This is depicted in FIG. 9A, in which each word on web page 900 has been tokenized (as indicated by the box surrounding each word). As illustrated in FIG. 9A, web page 900 includes a map widget 902 and an image 906. In this example the map widget is ignored during the scraping process and so the text 904 associated with the map widget is ignored or otherwise excluded from processing.

With the word content tokenized, in step 800, horizontal breaks between the tokenized words in the as-rendered web page are identified by looking at the bounding boxes of each of the words listed in the scraper output. If there are no other tokenized words located within N pixels in the negative y-direction from the current word being analyzed, where N is the distance threshold computation based on the height of the word, roughly equal to the height of two line breaks, a horizontal break (e.g., a <br> tag) is added to the layout below the current word being analyzed. Horizontal lines 910 in FIG. 9B shows regions on the page where horizontal breaks would be added to the layout upon inspection of the tokenized words.

Figure 9C:
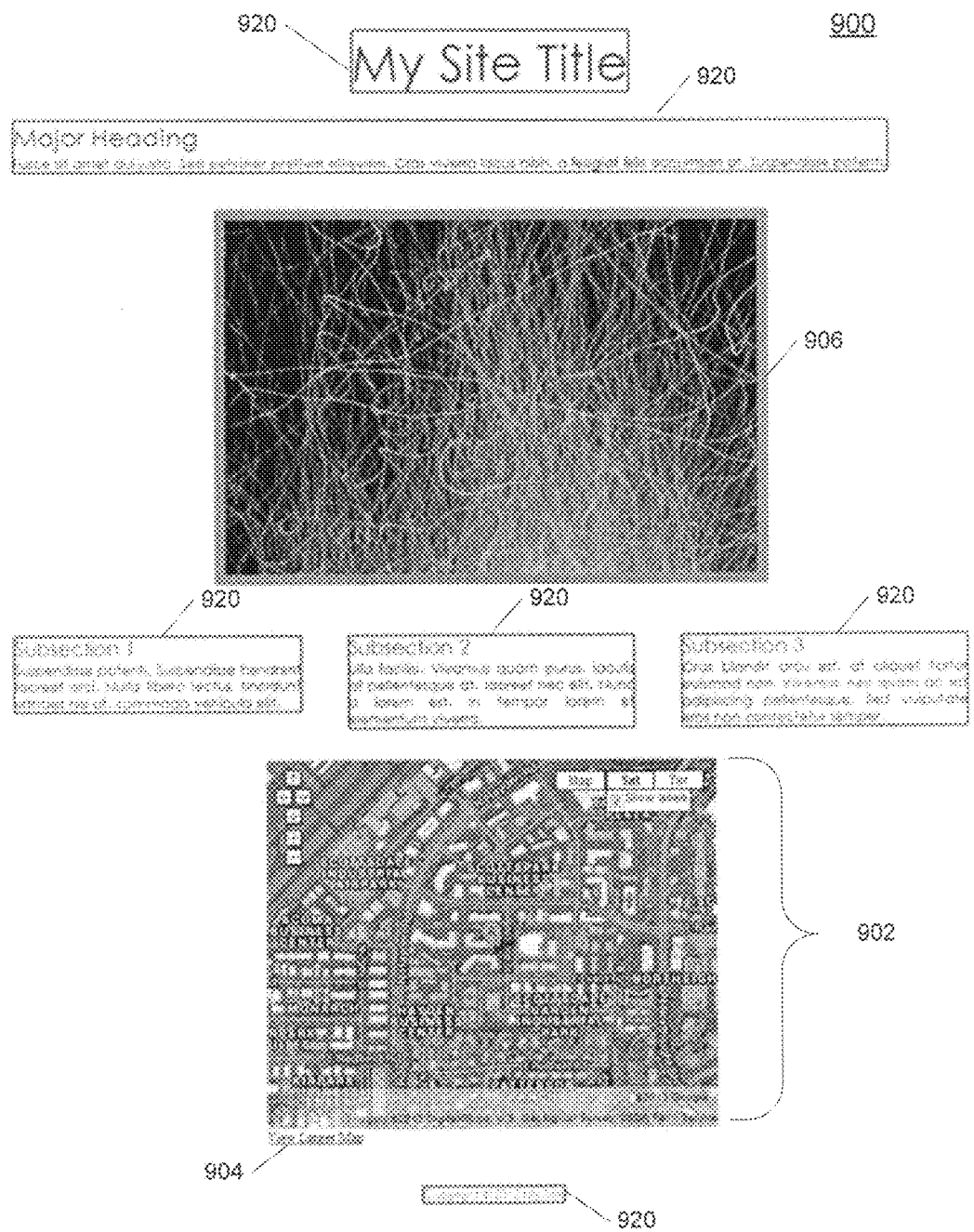

Having determined the horizontal break points, a number of columns of the tokenized words are identified in step 802. The determination of columns can be made by iterating through all of the words in the output generated by the scraping process and grouping the tokenized words into different columns. To create a column, two words are first identified whose bounding boxes are only separated by N pixels or less in the horizontal or x-direction (the vertical or y-direction distance between the words is ignored) where N is the distance threshold computation based on the height of the word, relatively equal to the width of a space in the current font size. Additional words may be added to the column group is the words fall within N x-direction pixels of any other word in the column group. This process continues until each word has been placed into a column group (i.e., grouped with at least one other word) or cannot be grouped with any other word. One restriction that may be placed on words being placed into the same column group is that the words must also be of matching alignment and type. Words can be aligned "left", "right", "center", or "justify", and can be of types "text" or "list". Words must have the same alignment and type in order to be considered to be matched within a column group. In FIG. 9C, various columns of words are illustrated by boxes 920.

Figure 9D:
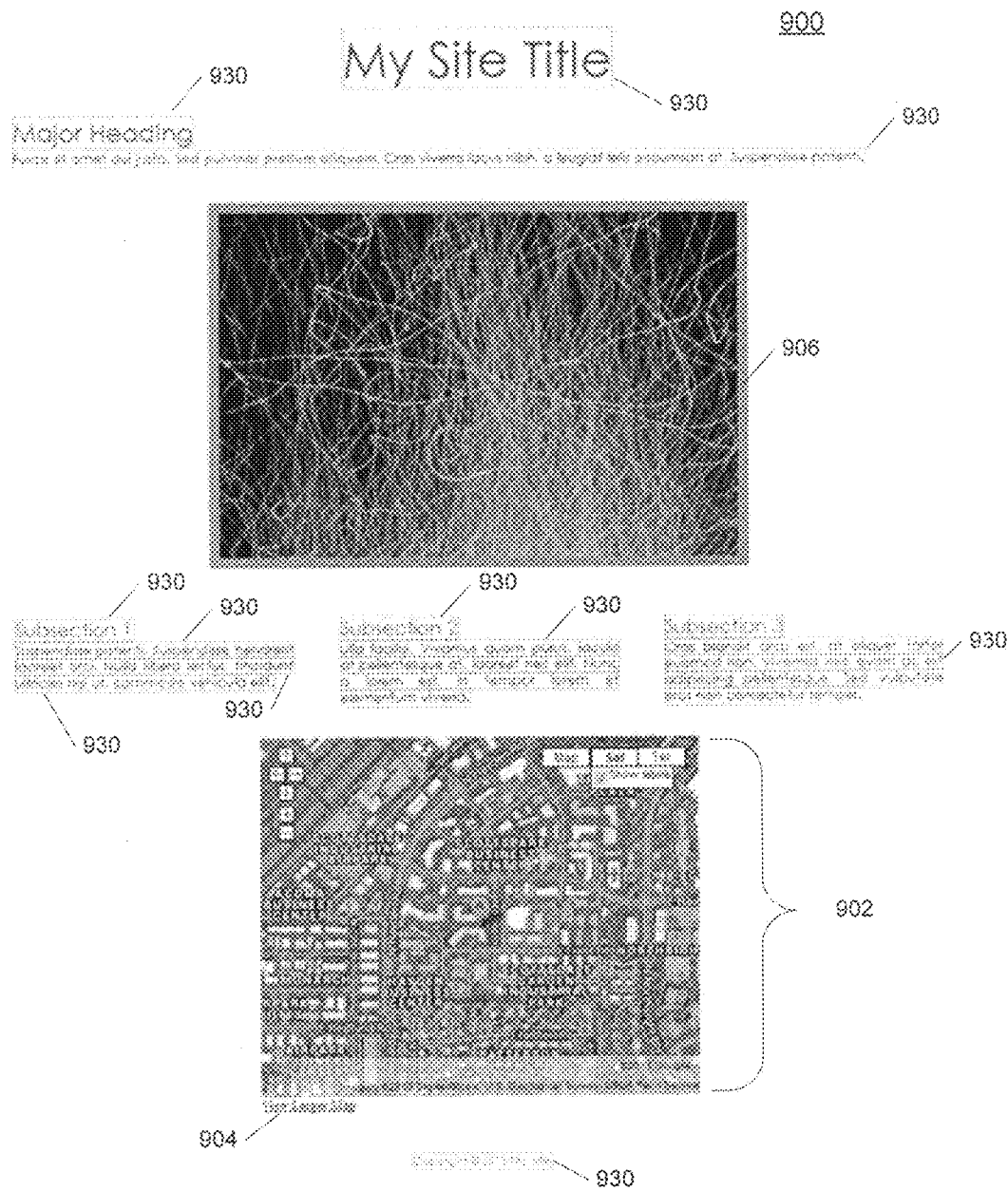

Returning to FIG. 8, after completion of step 802 a number of columns of words have been identified. Each column grouping includes a number of words that are relatively nearby one another in the x-direction on the as-rendered web page, ignoring separation between the words in the y-direction. Next, the words that have been grouped together in each column group must be analyzed to identify which words in the column group are part of the same line. Accordingly, lines of words in each column group are identified in step 804. Lines are identified by looking at the individual words that belong to a particular column group. The distances between the words in the column group are calculated in the x- and y-directions and compared to thresholds in order to determine which words should be grouped into a line. The thresholds may be based on the height of the words in the section in order to calculate appropriate horizontal and vertical distances for individual words to be considered within lines. For the x-direction, this may be roughly equal to the width of two characters. For the y-direction, this can be roughly equal to half the height of a line. In FIG. 9D, lines of words are indicated by boxes 930.

Finally, in step 806, paragraphs are formed by grouping lines that have been identified in each column group. To do this, the distances between the bounding boxes surrounding the lines 930 in a particular column grouping 920 are calculated in the x- and y-directions. When calculating the distance between lines in the x-direction, the determination of distance may be calculated differently based on the alignment of the text in each line. For left-aligned text, the x-direction distances between the left sides of the bounding boxes of each line can be calculated. For right-aligned text, the same calculation is performed using the right-side of the bounding boxes of each line in the section. For center-aligned or justified text, the calculation is performed based on the vertical midpoint of each line. The midpoint of a line may be calculated by adding up the widths of each word in the line. That distance can then be divided into two and added to x-position of the leftmost side of the leftmost word in the line.

After the distances between two lines in the same column group have been calculated in both the x-direction and y-direction, the distances are compared to thresholds to determine whether the two lines should be grouped together into a paragraph. If the distances are under a calculated threshold (e.g., based on font size), the lines are grouped into a paragraph. In one implementation, the threshold in the x-direction is a relatively small value approximately equal to half the width of a character, while the threshold in the y-direction is approximately the height of two lines to enable double line breaks to be part of the same resulting paragraph.

Figure 9E:
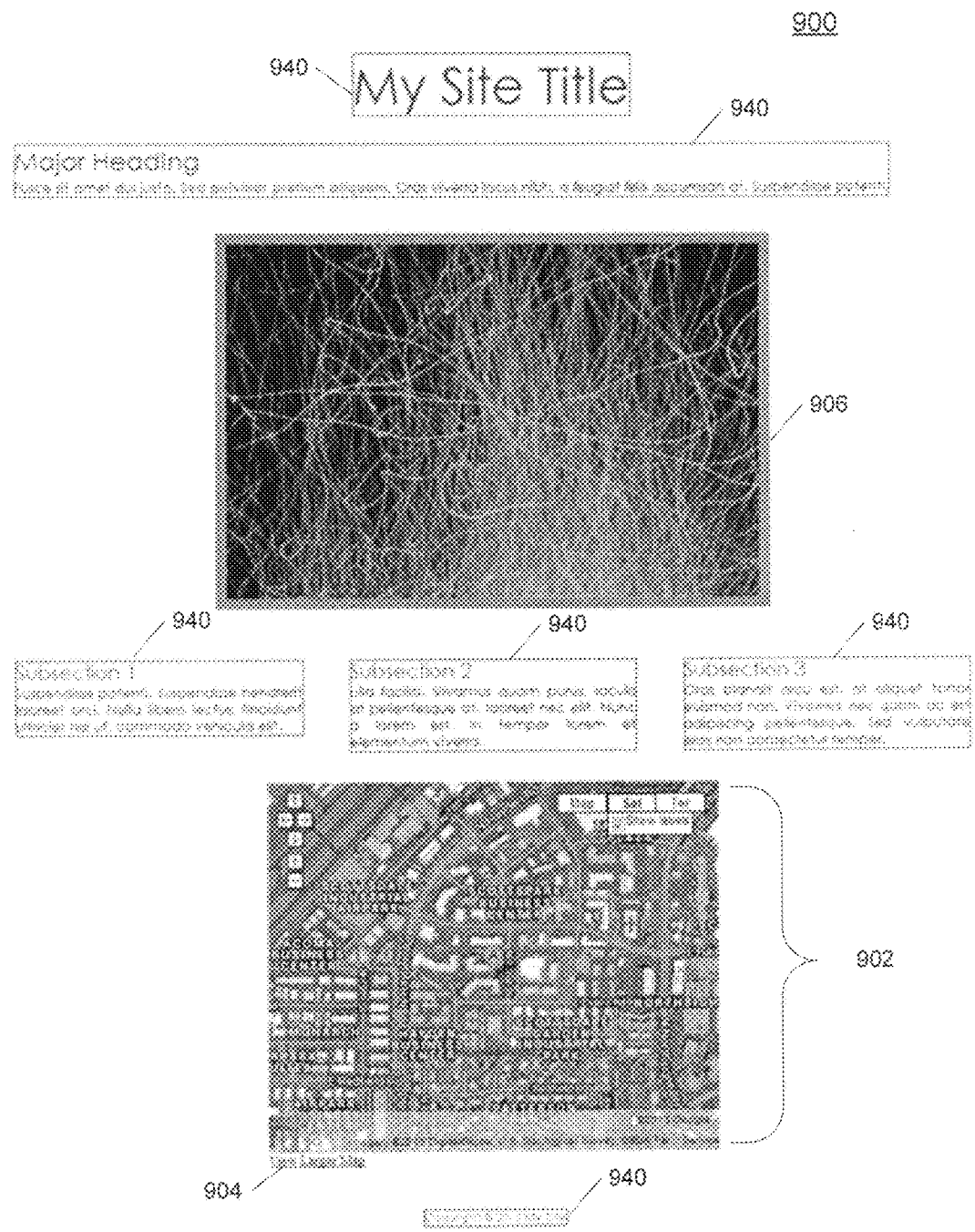

After the lines in a particular column group have been grouped into paragraph, the lines making up each paragraph are sorted based on the y-coordinate position of the baselines of each line (e.g., the lower line of the bounding boxes of each word in the line). This arranges the lines within each paragraph in correct order. Paragraphs themselves can be ordered by location so that paragraphs at the top left of the page are ordered before paragraphs at the bottom right of the page (note that this ordering may be reversed if the website is in a language having a right-to-left reading order). The sorting of the paragraphs can be achieved by sorting the paragraphs first by vertical position of the web page, followed by horizontal position on the web page. In FIG. 9E, paragraphs are represented by boxes 940.

To summarize, referring to the web page depicted in FIGS. 9A-9E, horizontal breaks 910 were detected above the web page's image, above the map widget, and below the page footer. Columns of text 920 were identified between pieces of text of similar alignment and type. In many cases, the boxes 920 indicating columns will match the boxes 940 indicating paragraphs. In some cases, however, single columns of text may include multiple paragraphs that are separated in the y-direction by a distance exceeding the y-direction threshold for paragraphs.

In some implementations of the present system, rather than rely on the method of FIG. 8 to analyzed the scraped website content in order to group related words accurately, a method may be utilized that inspects the rendered web page's DOM in order to identify related text. By analyzing the DOM, it may be possible to determine whether different text content is grouped together by identify text falling under a common grouping node. A grouping node may be defined as any ancestor node that does not contain any children aside from text elements. For example, if two paragraphs are both wrapped in a <div> tag that does not contain any other elements, that <div> tag is the grouping node for those paragraphs. If that <div> tag also has a parent that contains a third text node, then the three paragraphs would be in a group, with the parent node being the grouping node. In that same scenario, if that common ancestor had a descendant that was not a piece of text (e.g. a widget or image), the common ancestor cannot qualify as a grouping node.

Figure 14:
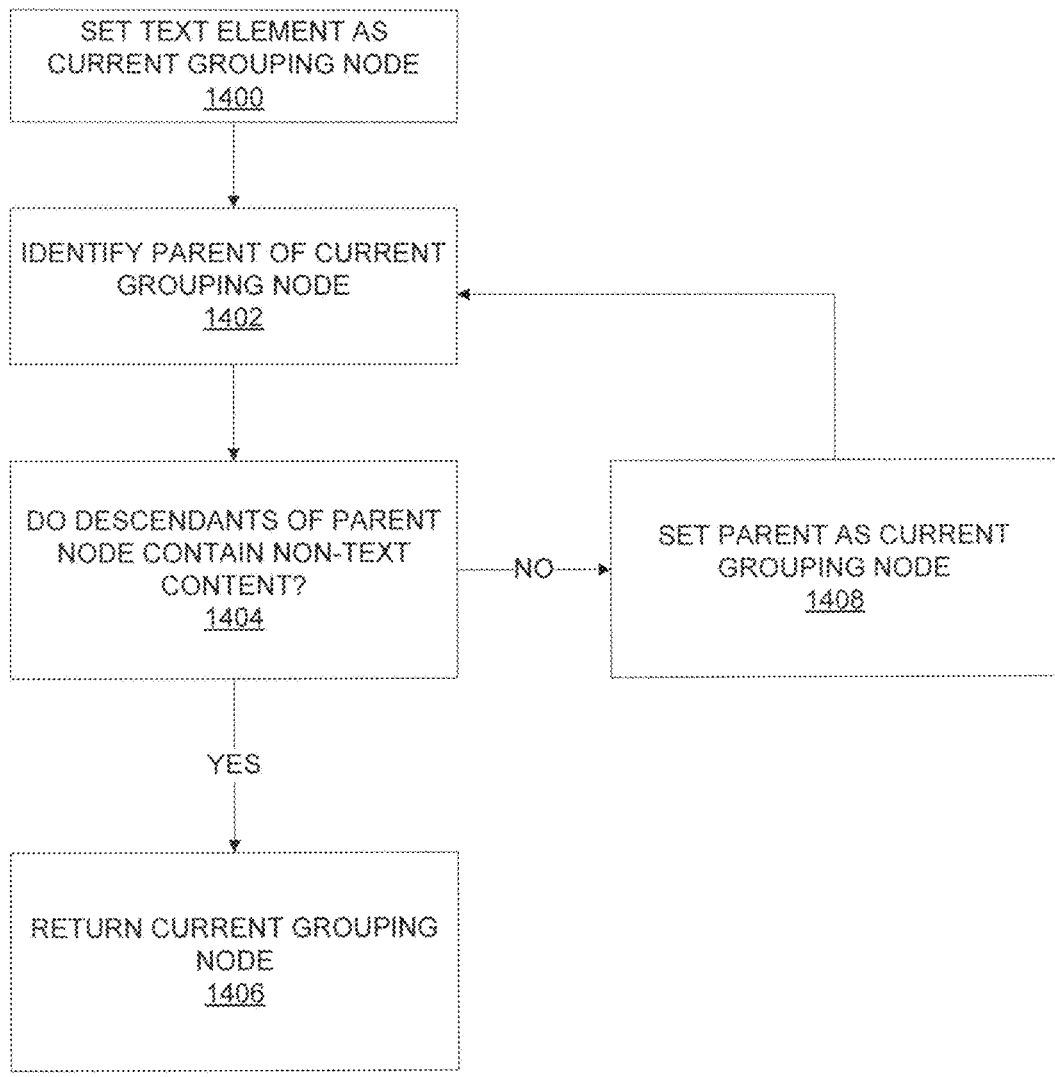
FIG. 14 is a flowchart illustrating an example method for identifying a grouping node for a collection of text elements.

FIG. 14 is a flowchart illustrating an example method for identifying a grouping node for a collection of text elements. In step 1400, the method begins by setting a first text element as a current grouping node. In step 1402, the parent element of the current grouping node is identified. Once the parent is identified, in step 1404 all of the descendants of the parent node are analyzed to determine whether any of the descendants contain content that is not text. If so, the current grouping node is identified as the grouping node for the text content. If not, the parent is identified as the current node in step 1408 and the method returns to step 1402. Eventually a parent will be identified that contains non-text content and the method will move to step 1406 and a grouping node will be identified. Alternatively, the current grouping node may not have a parent, in which case the current grouping node is returned as the grouping node. Once the grouping node has been identified, all text content falling under that grouping node can be collected together into a group.

After the text is grouped (e.g., according to the method of FIG. 8), a code generation or rendering process inspects each paragraph, line, and word to determine to which styles they have been mapped, in order to determine the correct HTML to generate. The generation process is designed to generate semantically accurate HTML in order to improve SEO scores for pages that have been run through this process.

Text will be placed in flat hierarchies of paragraph, header, or list tags. Phrases with emphasis, such as bold, italic, or underlined text, will be subsequently wrapped in "<strong>", "<em>" or "<span>" tags, as hierarchical children of the parent paragraph or list. Links are similarly detected, and text links will be wrapped in anchor ("<a>") tags. This process generally involves analyzing the style of each of the words making up each paragraph to identify a tag in the corresponding style sheet having the same style. Groups of words that are next to one another and each share the same style will then be grouped together under a single tag that, as defined in the style sheet, matches the style of those words.

Other elements, such as images or shapes, do not require a rendering process. Instead, for these elements, the styles identified during the style mapping process are assigned to the elements as properties. For example, if there are 5 images on a particular web page, and each image has a 3 pixel red border, the master style sheet will contain a class that defines a corresponding styling, and that will be assigned as the "CssClass" property for those images.

For example, again with reference to FIGS. 9A-9E, there are a number of distinct text styles in use on the web page that have been identified during the generation of a master style sheet for the web page (e.g., using the method illustrated in FIG. 5). With the master style sheet created, the font styling of each text group is matched to one of the entries in the master style sheet. If a match is detected, then the selector in the style sheet that is associated with the matching font styling is wrapped around the text content in the generated HTML. Accordingly, the page title "My Site Title" at the top, would be generated inside of an "<h1>" tag. "Major Heading", the primary header, would be generated inside of an "<h2>" tag, and the "Subsection 1", "Subsection 2", and "Subsection 3" headings would be generated inside of an "<h3>" tag. The rest of the text would be placed into "<p>" tags. With some portions of the text being placed into <strong> tags. The text is generated with the "left" justified class applied, since it is left-aligned.

Figure 10:
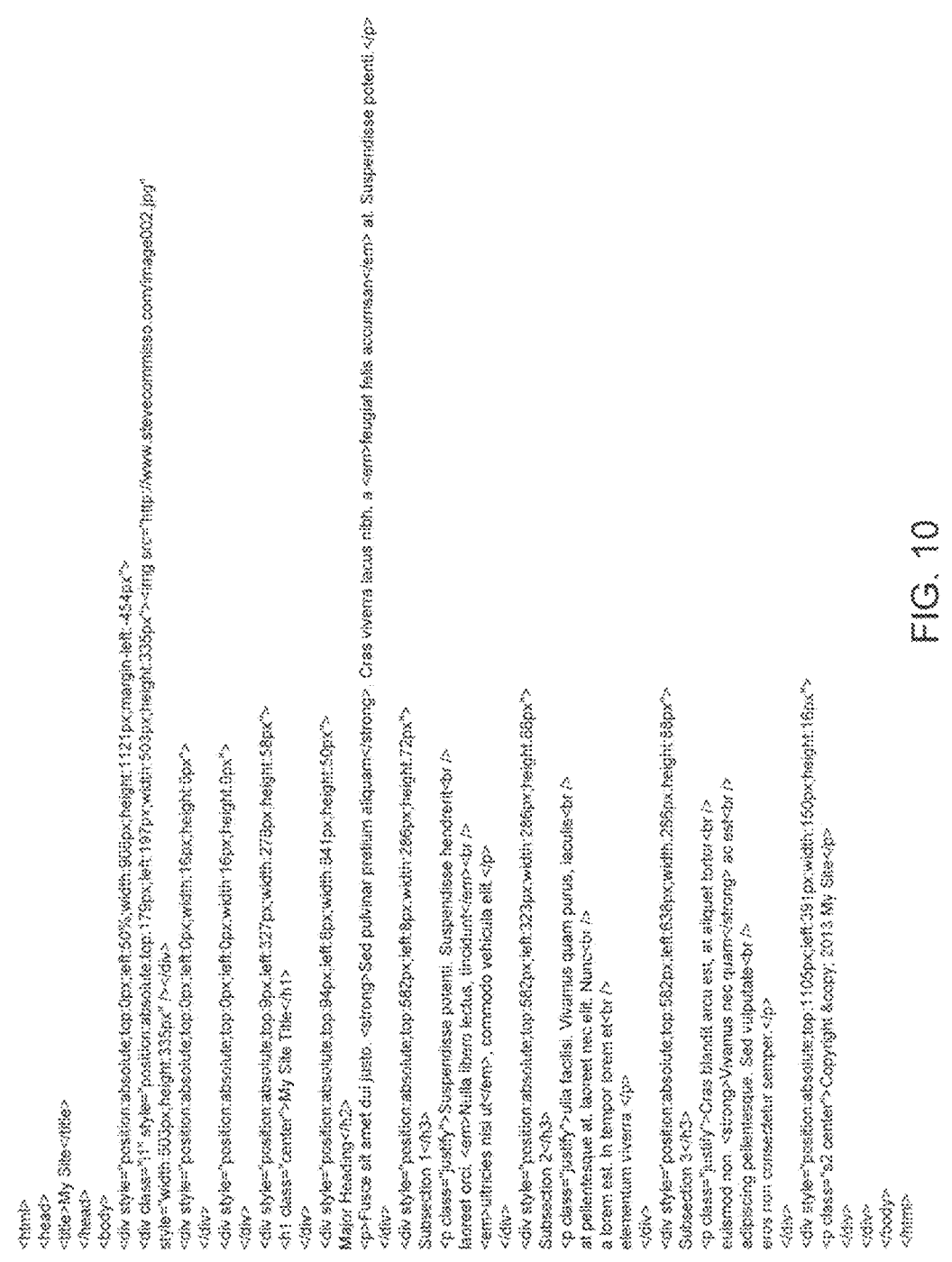

This code generation or rendering results in HTML output for each text group that is both easy to read by humans. Additionally, because the code is refined (through the use of the master style sheet and improved used of HTML elements to group displayed content), the code can be easier to import, such as into a web site builder application. Additionally, because the resulting code is well formed, the code provides semantic context for search engines spidering the web site. This may result in improved SEO rankings for web sites that are generated using the method described herein. The example HTML output of this process for web page of FIGS. 9A-9E is shown in FIG. 10. When generating the HTML output, all items on the web page (e.g., text and non-text) can be ordered by y-position, followed by x-position, so that items in the top left of the web page can be rendered into the HTML output before items in the bottom right. Since the items are absolute positioned, it may not be necessary to determine in what order to render the items. This sorting may only be applied for SEO purposes, with the theory that items at the top of a web page are more important than items at the bottom.

Once the new HTML has been generated for the web site, the new HTML can then be imported into an application suitable for editing or revising the web site content, such as a web site builder. As discussed above, because the new HTML is more correctly formed, this process is facilitated.

Figure 11:
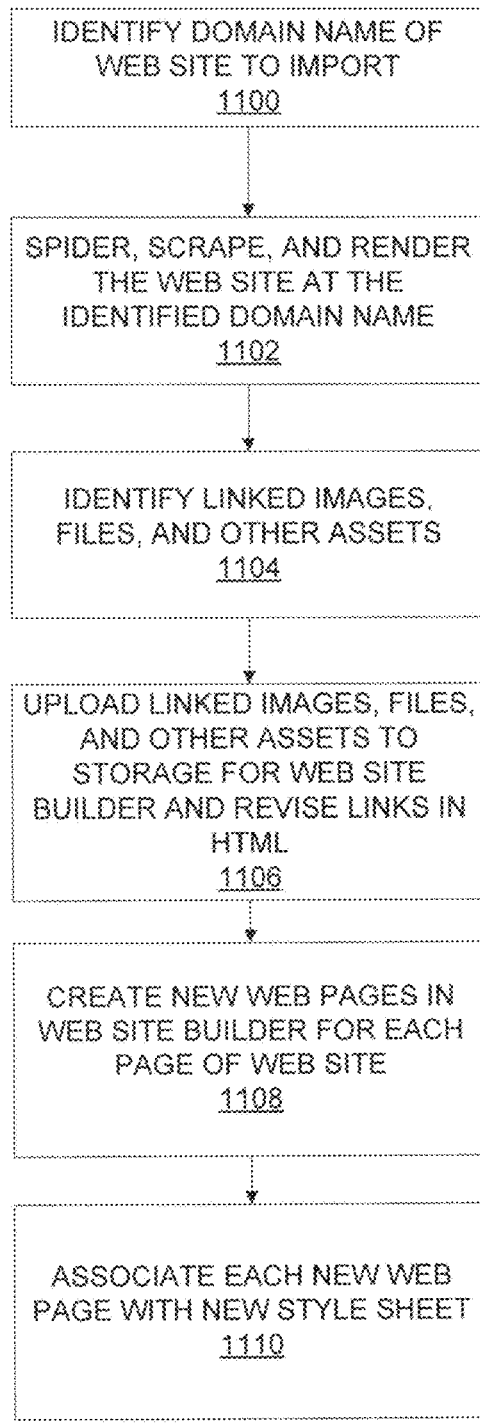
FIG. 11 is a flowchart depicting an example method for importing a web site having underlying code generated in accordance with the present disclosure.

FIG. 11 is a flowchart depicting an example method for importing a web site having underlying code (e.g., HTML and style sheets) generated according to the methods described above. The process may be initiated, for example, by a user accessing a web site builder application. If the user has an account associated with the web site builder application, the user can login into that account. If not, the user can create a new account. The user then, using a suitable interface provided by the web site builder, enters a domain name for a web site to be imported in step 1100. The domain name is received by the web site builder and, in step 1102, the web site builder (or other computer system in communication with the computer server hosting the web site builder) spiders, scrapes, and generates or renders the web site at the indicated domain name, in accordance with the methods described above. The result of step 1102 is, as described above, a master style sheet for the web site as well as new HTML code recreating each web page of the web site.

In step 1104, all web site assets, such as linked multimedia (e.g., images), files, and the like are identified. The assets may linked within the HTML code of the web site or in the web site's style sheet. Those linked assets can then be retrieved and uploaded into the web site builder application in step 1106. If the web site builder application is a hosted solution, for example, the linked assets may be uploaded into a cloud storage solution accessible to the web site builder. At this time, the references in the HTML or style sheet pointing to the uploaded assets may be updated to point to the location of the assets within the storage systems associated with the web site builder.

In step 1108 a new web page is created in the web site builder application for every web page of the existing web site. The names of the web pages created in the web site builder may mimic those of the original, corresponding web pages. This may enable the new web site being imported into the web site builder, once published, to have similar URLs to those of the original web site. This may be useful to ensure that inbound links to the web site continue working.

In step 1110, each of the new pages created within the web site builder is associated with the new style sheet, created in accordance with the methods described above. Also, with each new page created within the web site builder, the new HTML can be updated so that any links to web pages of the web site will match the paths of the new web pages that have been created within the web site builder.

Then, for each web page, the elements identified in the analysis process are transformed into a format suitable for loading into the web site builder. The transformed elements can then be stored in a suitable database accessible to the web site builder application.

The present system and method for importing web site content can be optimized to analyze any web site on the Internet, and supply an optimized version of the underlying HTML code of the web site to, for example, a web suite builder application or other target recipient. The original web site is improved from the original by transforming any text depicted in the web site into SEO-friendly HTML, embedding all styles found in the web site into a master site style sheet that is shared across every web page of the web site. The web site can then be more easily loaded into a web site builder application or a Content Delivery Network (CDN).

This process results in a new web site that looks the same as the original web site, but can be optimized for search engines (SEO) as well as performance via CDN delivery of binary data.

Figure 12:
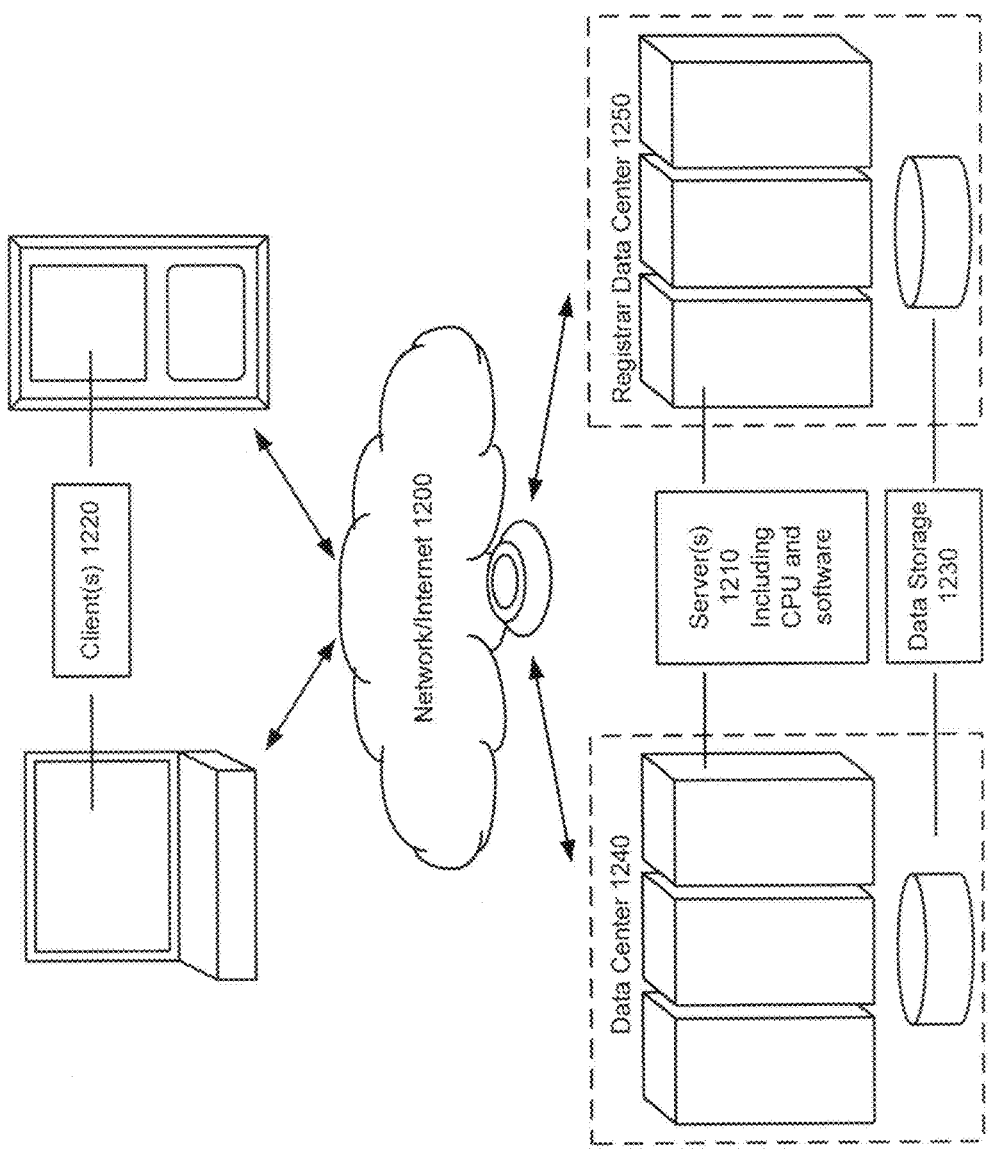
FIG. 12 is an illustration of an environment in which the present system for analyzing and generating web site content may be implemented.
Figure 13:
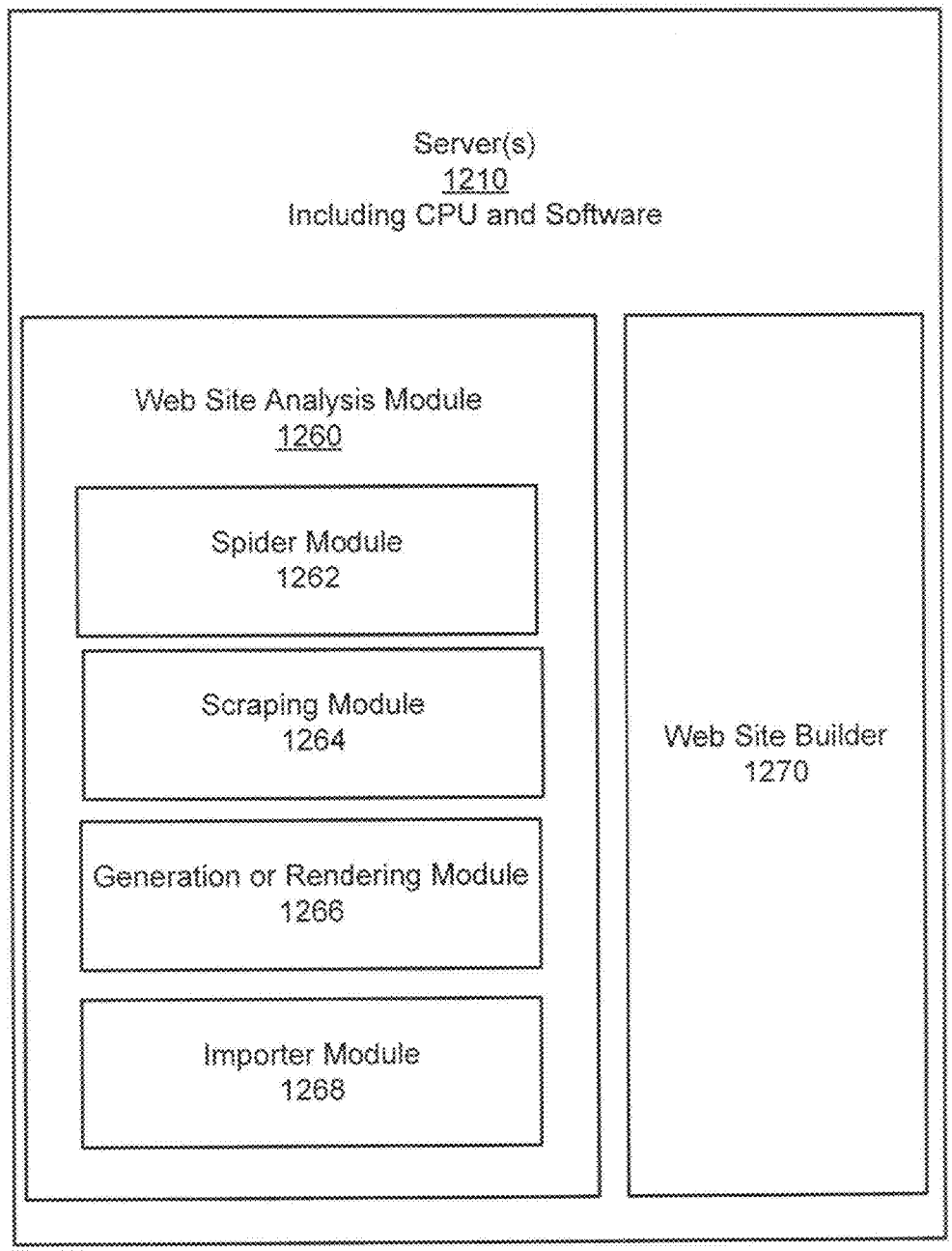
FIG. 13 is a block diagram showing a potential implementation of a server included in the environment of FIG. 12.

Several different environments may be used to accomplish the steps of embodiments disclosed herein. FIGS. 12 and 13 demonstrate a streamlined example of such an environment and illustrate a non-limiting example of a system and/or structure that may be used to accomplish the methods and embodiments disclosed and described herein. Such methods may be performed by any central processing unit (CPU) in any computing system, such as a microprocessor running on at least one server 1210 and/or client 1220, and executing instructions stored (perhaps as scripts and/or software, possibly as software modules) in computer-readable media accessible to the CPU, such as a hard disk drive on a server 1210 and/or client 1220.

The example embodiments herein place no limitations on whom or what may comprise users. Thus, as non-limiting examples, users may comprise any individual, entity, business, corporation, partnership, organization, governmental entity, and/or educational institution.

The example embodiments shown and described herein exist within the framework of a network 1200 and should not limit possible network configuration or connectivity. Such a network 1200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 1210 and at least one client 1220 may be communicatively coupled to the network 1200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 1210 and client(s) 1220 (along with software modules and the data storage 1230 disclosed herein) may be communicatively coupled to the network 1200 and to each other in such a way as to allow the exchange of information required to accomplish the method steps disclosed herein, including, but not limited to receiving the information from a user interface on one or more clients 1220, and one or more servers 1210 receiving the information.

The client 1220 may be any computer or program that provides services to other computers, programs, or users either in the same computer or over a computer network 1200. As non-limiting examples, the client 1220 may be an application, communication, mail, database, proxy, fax, file, media, web, peer-to-peer, or standalone computer, cell phone, "smart" phone, personal digital assistant (PDA), etc. which may contain an operating system, a full file system, a plurality of other necessary utilities or applications or any combination thereof on the client 1220. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

The client computer(s) 1220 which may be operated by one or more users and may be used to connect to the network 1200 to accomplish the illustrated embodiments may include, but are not limited to, a desktop computer, a laptop computer, a hand held computer, a terminal, a television, a television set top box, a cellular phone, a wireless phone, a wireless hand held device, a "smart" phone, an Internet access device, a rich client, thin client, or any other client functional with a client/server computing architecture. Client software may be used for authenticated remote access to one more hosting computers or servers, described below. These may be, but are not limited to being accessed by a remote desktop program and/or a web browser, as are known in the art.

The user interface displayed on the client(s) 1220 or the server(s) 1210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc.

The software modules used in the context of the current invention may be stored in the memory of—and run on—at least one server 1210 and/or client 1220. The software modules may comprise software and/or scripts containing instructions that, when executed by a microprocessor on a server 1210 and/or client 1220, cause the microprocessor to accomplish the purpose of the module or the methods disclosed herein.

The software modules may interact and/or exchange information via an Application Programming Interface or API. An API may be a software-to-software interface that specifies the protocol defining how independent computer programs interact or communicate with each other. The API may allow a requesting party's software to communicate and interact with the software application and/or its provider-perhaps over a network-through a series of function calls (requests for services). It may comprise an interface provided by the software application and/or its provider to support function calls made of the software application by other computer programs, perhaps those utilized by the requesting party to provide information for publishing or posting domain name and hosted website information.

The server(s) 1210 utilized within the disclosed system may comprise any computer or program that provides services to other computers, programs, or users either in the same computer or over a computer network 1200. The server 1210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The server(s) 1210 or software modules within the server(s) 1210 may use query languages such as Postgre MySQL to retrieve the content from data storage 1230. Server-side scripting languages such as ASP, PHP, CGI/Perl, proprietary scripting software/modules/components etc. may be used to process the retrieved data. The retrieved data may be analyzed in order to determine information recognized by the scripting language, information to be matched to those found in data storage, availability of requested information, comparisons to information displayed and input/selected from the user interface or any other content retrieval within the method steps disclosed herein.

The server 1210 and/or client 1220 may be communicatively coupled to data storage 1230 to retrieve any information requested. The data storage 1230 may be any computer components, devices, and/or recording media that may retain digital data used for computing for some interval of time. The storage may be capable of retaining stored content for any data requested, on a single machine or in a cluster of computers over the network 1200, in separate memory areas of the same machine such as different hard drives, or in separate partitions within the same hard drive, such as a database partition.

Non-limiting examples of the data storage 1230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

The server(s) 1210 and data storage 1230 may exist and/or be hosted in one or more data centers (1240, 1250). These data centers 1240/1250 may provide hosting services for websites, services or software relating to stored information, or any related hosted website including, but not limited to hosting one or more computers or servers in a data center 1240/1250 as well as providing the general infrastructure necessary to offer hosting services to Internet users including hardware, software, Internet web sites, hosting servers, and electronic communication means necessary to connect multiple computers and/or servers to the Internet or any other network 1200. These data centers 1240/1250 or the related clients 1220 may accept messages from text messages, SMS, web, mobile web, instant message, third party API projects or other third party applications.

The system also may comprise a web site analysis module 1260 that may be stored in the memory of—and run on—at least one server 1210 and may comprise any software and/or scripts containing instructions that, when executed by the server's 1210 microprocessor, cause the microprocessor to process and analyze a web site using one or more of the methods described herein. As illustrated in FIG. 13, the web site analysis module 1260 may comprise a spider module 1262, scraping module 1264, generation or rendering module 1266, and importer module 1268.

The spider module 1262 may comprise scripts and/or software running on the server 1210 that operates to analyze a web site and identify a listing of each web page making up the web site. The spider module 1262 may be configured, for example, to execute a method such as that illustrated in FIG. 2.

The scraping module 1264 may comprise scripts and/or software running on the server 1210 that operates to analyze the content of a rendered web page to analyze one or more displayed elements on that rendered web page. For example, the scraping module 1264 may be configured, for example, to execute a method such as that illustrated in FIG. 3.

The generation or rendering module 1266 may comprise scripts and/or software running on the server 1210 that operates to analyze the output generated by scraping module 1264 to generate a refined version of the web site. For example, the generation or rendering module 1266 may be configured, for example, to execute, at least in part, a method such as that illustrated in FIG. 8.

The importer module 1268 may comprise scripts and/or software running on the server 1210 that operates to analyze the output of generation or rendering module 1266 and import that output into another application, such as web site builder application 1270. The web site builder application 1270 may comprise scripts and/or software running on the server 1210 that operates to provide a user with an interface enabling to the user to create new web site content or revise existing content.

In various implementations the present methods may be implemented by computing devices, such as server computers, desktop or portable computers, mobile devices, distributed computing services, and the like. The devices may request web pages using any electronic communication medium, communication protocol, and computer software suitable for transmission of data over the Internet. Examples include, respectively and without limitation: a wired connection, WiFi or other wireless network, cellular network, or satellite network; Transmission Control Protocol and Internet Protocol ("TCP/IP"), Global System for mobile communications ("GSM") protocols, code division multiple access ("CDMA") protocols, and Long Term Evolution ("LTE") mobile phone protocols; and web browsers such as MICROSOFT INTERNET EXPLORER, MOZILLA FIREFOX, and APPLE SAFARI.

In one implementation, the present invention is a method including rendering, by at least one server communicatively coupled to a network, a web page to create a rendered web page, and inspecting, by the at least one server, the rendered web page to identify a plurality of display elements. The method includes capturing, by the at least one server, display attributes for each one of the plurality of display elements in the rendered web page, and generating, by the at least one server, mark-up code using the display attributes for each one of the plurality of display elements.

In another implementation, the present invention is a method including identifying, by at least one server communicatively coupled to a network, a plurality of web pages. The plurality of web pages are associated with a web site. For each one of the plurality of web pages, the method includes rendering, by the at least one server, the one of the plurality of web pages to create a rendered web page, inspecting, by the at least one server, the rendered web page to identify a plurality of display elements, capturing, by the at least one server, display attributes for each one of the plurality of display elements in the rendered web page, and generating, by the at least one server, mark-up code using the display attributes for each one of the plurality of display elements.

In another implementation, the present invention is a system including a processor configured to identify a plurality of web pages. The plurality of web pages are associated with a web site. For each one of the plurality of web pages, the processor is configured to render the one of the plurality of web pages to create a rendered web page, inspect the rendered web page to identify a plurality of display elements, capture display attributes for each one of the plurality of display elements in the rendered web page, and generate mark-up code using the display attributes for each one of the plurality of display elements.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As a non-limiting example, the steps described above (and all methods described herein) may be performed by any central processing unit (CPU) or processor in a computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client-side software, browser-implemented software (e.g., a browser plugin), and other software configurations.

The present invention has been described in terms of one or more preferred embodiments, and it should be appreciated that many equivalents, alternatives, variations, and modifications, aside from those expressly stated, are possible and within the scope of the invention.

I claim:

1. A method, comprising:
rendering, by at least one server communicatively coupled to a network, a web page to create a rendered web page;
storing, by the at least one server, a screenshot depicting the rendered web page;
modifying the rendered web page to tokenize a plurality of words in the rendered web page by converting each word in the plurality of words into a separate display element in a document object model of the rendered web page;
inspecting, by the at least one server, the document object model to identify a plurality of display elements by:
determining a z-index position of a first display element in the plurality of display elements,
determining a z-index position of a second display element in the plurality of display elements, wherein the second display element overlaps the first display element in the rendered web page,
determining that the z-index position of the first display element is greater than the z-index position of the second display element, and
including the first display element in the plurality of display elements;
identifying a grouping node for the plurality of display elements in the document object model by:
identifying, for a first display element in the document object model, an ancestor node in the document object model;
determining that the ancestor node in the document object model contains a number of child nodes, wherein each child node contains only text elements;
when the ancestor node contains a number of child nodes and each child node contains only text elements, determining that the ancestor node is a grouping node for the plurality of display elements;
capturing, by the at least one server, display attributes for each one of the plurality of display elements;
generating, by the at least one server, mark-up code using the display attributes for each one of the plurality of display elements and the grouping node in the document object model by:
determining a most common text style in the plurality of display elements in the document object model,
associating the most common text style with a paragraph tag in a style sheet,
determining a second text style in the plurality of display elements including a font size larger than a font size of the most common text style,
associating the second text style with an H1 tag in the style sheet,
determining a third text style in the plurality of display elements including a font size smaller than the font size of the most common text style, and
associating the third text style with a span tag having a first class in the style sheet;
generating, by the at least one server, a second rendered web page using the mark-up code and the style sheet; and
generating, by the at least one server, a user interface depicting simultaneously the second rendered web page and the screenshot depicting the rendered web page.

2. The method of claim 1, wherein converting each word in the plurality of words into a separate display element in the document object model includes inserting a span tag around each word in the plurality of words in the document object model.

3. The method of claim 1, including grouping one or more of the plurality of words into columns.

4. The method of claim 3, including identifying one or more lines of words in each one of the columns.

5. The method of claim 1, wherein the plurality of display elements include words, images, or shapes.

6. The method of claim 1, wherein the display attributes include a position, a font size, or a border attribute.

7. The method of claim 1, including identifying a user associated with the web page.

8. A method, comprising:
identifying, by at least one server communicatively coupled to a network, a plurality of web pages, the plurality of web pages being associated with a web site;
for each one of the plurality of web pages:
rendering, by the at least one server, the one of the plurality of web pages to create a rendered web page;
storing, by the at least one server, a screenshot depicting the rendered web page;
modifying the rendered web page to tokenize a plurality of words in the rendered web page by converting each word in the plurality of words into a separate display element in a document object model of the rendered web page;
inspecting, by the at least one server, the document object model to identify a plurality of display elements by:
determining a z-index position of a first display element in the plurality of display elements,
determining a z-index position of a second display element in the plurality of display elements, wherein the second display element overlaps the first display element in the rendered web page,
determining that the z-index position of the first display element is greater than the z-index position of the second display element, and
including the first display element in the plurality of display elements;
identifying a grouping node for the plurality of display elements in the document object model by:
identifying, for a first display element in the document object model, an ancestor node in the document object model;
determining that the ancestor node in the document object model contains a number of child nodes, wherein each child node contains only text elements;
when the ancestor node contains a number of child nodes and each child node contains only text elements, determining that the ancestor node is a grouping node for the plurality of display elements;

capturing, by the at least one server, display attributes for each one of the plurality of display elements;

generating, by the at least one server, mark-up code using the display attributes for each one of the plurality of display elements and the grouping node in the document object model by:
   determining a most common text style in the plurality of display elements in the document object model,
   associating the most common text style with a paragraph tag in a style sheet,
   determining a second text style in the plurality of display elements including a font size larger than a font size of the most common text style,
   associating the second text style with an HI tag in the style sheet,
   determining a third text style in the plurality of display elements including a font size smaller than the font size of the most common text style, and
   associating the third text style with a span tag having a first class in the style sheet;

generating, by the at least one server, a second rendered web page using the mark-up code and the style sheet; and generating, by the at least one server, a user interface depicting simultaneously the second rendered web page and the screenshot depicting the rendered web page.

9. The method of claim 8, wherein converting each word in the plurality of words into a separate display element in the document object model includes inserting a span tag around each word in the plurality of words in the document object model.

10. The method of claim 8, including grouping one or more of the plurality of words into columns.

11. The method of claim 10, including identifying one or more lines of words in each one of the columns.

12. A system, comprising:
   a processor configured to:
      identify a plurality of web pages, the plurality of web pages being associated with a web site;
      for each one of the plurality of web pages:
         render the one of the plurality of web pages to create a rendered web page;
         store a screenshot depicting the rendered web page;
         modify the rendered web page to tokenize a plurality of words in the rendered web page by converting each word in the plurality of words into a separate display element in a document object model of the rendered web page;
         inspect the rendered web page to identify a plurality of display elements by:
            determining a z-index position of a first display element in the plurality of display elements,
            determining a z-index position of a second display element in the plurality of display elements,
            wherein the second display element overlaps the first display element in the rendered web page,
            determining that the z-index position of the first display element is greater than the z-index position of the second display element, and
            including the first display element in the plurality of display elements;
         identify a grouping node for the plurality of display elements in the document object model by:
            identifying, for a first display element in the document object model, an ancestor node in the document object model;
            determining that the ancestor node in the document object model contains a number of child nodes, wherein each child node contains only text elements;
            when the ancestor node contains a number of child nodes and each child node contains only text elements, determining that the ancestor node is a grouping node for the plurality of display elements;
         capture display attributes for each one of the plurality of display elements;
         generate mark-up code using the display attributes for each one of the plurality of display elements and the grouping node in the document object model by:
            determining a most common text style in the plurality of display elements in the document object model,
            associating the most common text style with a paragraph tag in a style sheet,
            determining a second text style in the plurality of display elements including a font size larger than a font size of the most common text style,
            associating the second text style with an HI tag in the style sheet,
            determining a third text style in the plurality of display elements including a font size smaller than the font size of the most common text style, and
            associating the third text style with a span tag having a first class in the style sheet;
         generate a second rendered web page using the mark-up code and the style sheet; and
         generate a user interface depicting simultaneously the second rendered web page and the screenshot depicting the rendered web page.

13. The system of claim 12, wherein the processor is configured to insert a span tag around each word in the plurality of words in the document object model.

14. The system of claim 13, wherein the processor is configured to group one or more of the plurality of words into columns.

15. The system of claim 14, wherein the processor is configured to identify one or more lines of words in each one of the columns.

* * * * *